· US012260638B1

(12) United States Patent
Tong et al.

(10) Patent No.: US 12,260,638 B1
(45) Date of Patent: Mar. 25, 2025

(54) ADAPTIVE LEARNING SYSTEMS UTILIZING MACHINE LEARNING TECHNIQUES

(71) Applicant: Yixue Education Inc., Highland Park, NJ (US)

(72) Inventors: Jiarui Tong, Highland Park, NJ (US); Guodong Zhao, Pittsburgh, PA (US); Jiachen Gong, Pittsburgh, PA (US); Yuchen Xie, Pittsburgh, PA (US); Miaojun Xu, Pittsburgh, PA (US)

(73) Assignee: Squirrel Ai Learning Inc., Bellevue, WA (US)

( * ) Notice: Subject to any disclaimer, the term of this patent is extended or adjusted under 35 U.S.C. 154(b) by 0 days.

(21) Appl. No.: 17/139,984

(22) Filed: Dec. 31, 2020

(51) Int. Cl.
*G06N 5/02* (2023.01)
*G06F 3/04842* (2022.01)
*G06V 20/20* (2022.01)

(52) U.S. Cl.
CPC .......... *G06V 20/20* (2022.01); *G06F 3/04842* (2013.01); *G06N 5/02* (2013.01)

(58) Field of Classification Search
CPC ............ G06F 3/0482; G06N 5/02; G09B 7/02
See application file for complete search history.

(56) References Cited

U.S. PATENT DOCUMENTS

| | | | | |
|---|---|---|---|---|
| 10,540,906 B1* | 1/2020 | Fieldman | ................. | H04L 51/32 |
| 10,594,757 B1* | 3/2020 | Shevchenko | ......... | H04L 65/605 |
| 2005/0177574 A1* | 8/2005 | Riley | ................... | G06F 16/9558 |
| 2006/0129596 A1* | 6/2006 | Bays | ...................... | G06F 16/907 |
| 2007/0061144 A1* | 3/2007 | Grichnik | ................ | G05B 17/02 |
| | | | | 704/256.8 |
| 2008/0286740 A1* | 11/2008 | Wi | ......................... | G09B 19/00 |
| | | | | 434/350 |
| 2010/0151431 A1* | 6/2010 | Miller | ...................... | G09B 5/00 |
| | | | | 434/350 |

(Continued)

OTHER PUBLICATIONS

Mathematical-Knolwedge-Entity-Recognition, 5 pages, retrieved from http://github.com/wjn1996/Mathematical-Knowledge-Entity-Recognition on Nov. 10, 2020.

*Primary Examiner* — Phenuel S Salomon
(74) *Attorney, Agent, or Firm* — MagStone Law, LLP; Enshan Hong

(57) ABSTRACT

In accordance with some embodiments of the present disclosure, an apparatus for adaptive learning is provided. The apparatus may include a memory and a processing device. The processing device is configured to receive a user input providing a portion of an annotation to be associated with a practice problem and a user; identify one or more knowledge components relating to the user input; and autocomplete the annotation to include information of one or more of the knowledge components. The information of the one or more of the knowledge components may include at least one of a definition of a first knowledge component of the knowledge components relating to the first user input or an equation relating to the first knowledge component. In some embodiments, the knowledge components relating to the user input are identified by processing the user input using a trained machine learning model configured to recognize knowledge components.

14 Claims, 14 Drawing Sheets

(56) References Cited

U.S. PATENT DOCUMENTS

| | | | |
|---|---|---|---|
| 2010/0223341 A1* | 9/2010 | Manolescu | H04L 51/063 709/206 |
| 2011/0047160 A1* | 2/2011 | Hough | G06F 16/9574 707/740 |
| 2013/0031208 A1* | 1/2013 | Linton | G09B 7/02 709/217 |
| 2014/0223475 A1* | 8/2014 | Mcintire | G06F 16/7837 725/34 |
| 2014/0337438 A1* | 11/2014 | Govande | H04L 51/063 709/206 |
| 2016/0189210 A1* | 6/2016 | Lacey | G06Q 10/067 705/7.31 |
| 2016/0335550 A1* | 11/2016 | Achin | G06N 5/02 |
| 2017/0032377 A1* | 2/2017 | Navaratnam | B25J 11/0015 |
| 2017/0154544 A1* | 6/2017 | Hussam | G09B 7/02 |
| 2018/0357306 A1* | 12/2018 | Osotio | G06K 9/00302 |
| 2019/0087529 A1* | 3/2019 | Steingrimsson | G06N 3/0454 |
| 2019/0163500 A1* | 5/2019 | Daianu | H04L 67/306 |
| 2019/0244127 A1* | 8/2019 | Amado | G09B 7/02 |
| 2020/0258420 A1* | 8/2020 | Kurani | G06N 3/008 |
| 2021/0027647 A1* | 1/2021 | Baphna | G09B 7/00 |
| 2021/0081819 A1* | 3/2021 | Polleri | G06F 40/40 |
| 2021/0089934 A1* | 3/2021 | Thornley | G06F 40/30 |
| 2022/0366256 A1* | 11/2022 | Lehr | G06N 3/08 |

* cited by examiner

FIG. 9

ADAPTIVE LEARNING SYSTEMS UTILIZING MACHINE LEARNING TECHNIQUES

TECHNICAL FIELD

This disclosure relates to the field of computing systems utilizing machine learning techniques and, in particular, to adaptive learning systems utilizing machine learning techniques.

BACKGROUND

Adaptive learning is a technology that uses computer algorithms to respond to a student's interactions in real-time by automatically providing the student with individual support. Conventional adaptive learning systems are mainly used as platforms for distributing course materials and assignments to students. The students may submit the assignments to teachers using the conventional adaptive learning systems. The teachers may then provide feedback to the students via the conventional adaptive learning systems. As such, the conventional adaptive learning systems still heavily rely on teacher-directed instructions and the students' manual inputs. It would be desirable to provide students with a supervised adaptive learning experience using artificial intelligence such as machine learning techniques.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An apparatus in accordance with some implementations of the disclosure includes: a memory and a processing device communicably coupled to the memory, the processing device to: receive a first user input providing a portion of an annotation to be associated with a first practice problem and a first user; identify one or more knowledge components relating to the first user input; and autocomplete the annotation to include information of one or more of the knowledge components, wherein the information of the one or more of the knowledge components includes at least one of a definition of a first knowledge component of the knowledge components relating to the first user input or an equation relating to the first knowledge component.

In some embodiments, the first user input corresponds to a first user interaction with a first user interface element in a first user interface, and wherein, to autocomplete, by the processing device, the annotation to include information relating to one or more of the knowledge components, the processing device is further to present the information relating to the one or more knowledge components in the first user interface element in the first user interface.

In some embodiments, the processing device is to autocomplete the annotation to include the information relating to one or more of the knowledge components responsive to receiving a second user input initiating an autocomplete functionality provided by the processing device.

In some embodiments, the processing device is to autocomplete the annotation to include the information relating to one or more of the knowledge components responsive to receiving the first user input.

In some embodiments, to identify the one or more knowledge components relating to the first user input, the processing device is further to process the first user input using a trained machine learning model configured to recognize knowledge components.

In some embodiments, the processing device is further to: in view of a user request for learning data relating to the first user, present a personalized report including information of a first problem set associated with the first user, wherein the first problem set includes at least one annotated practice problem relating to the first user, wherein, to present the personalized report, the processing device is further to: present, in a second user interface, first content corresponding to the at least one annotated practice problem relating to the first user; and present, in the second user interface, second content corresponding to annotation data association with the at least one annotated practice problem relating to the first user.

In some embodiments, the annotation data includes a message directed from the first user to a second user and a response to the message.

In some embodiments, the annotation data includes the autocompleted annotation including the information of the one or more of the knowledge components.

In some embodiments, the processing device is further to present, on a display, information about a second problem set including one or more recommended practice problems, wherein the one or more recommended practice problems are identified based at least in part on predicted tag information relating to a plurality of known practice problems, and wherein the predicted tag information relating to the plurality of known practice problems includes a plurality of predicted tags associated with a plurality of users and the plurality of known practice problems.

In some embodiments, the one or more recommended practice problems are identified based at least in part on the identified knowledge components.

In some embodiments, the one or more recommended practice problems are identified based at least in part on the identified knowledge components.

A method in accordance with some implementations of the disclosure includes: receiving, by a processing device, a first user input providing a portion of an annotation to be associated with a first practice problem and a first user; identifying one or more knowledge components relating to the first user input; and autocompleting, by the processing device, the annotation to include information of one or more of the knowledge components, wherein the information of the one or more of the knowledge components includes at least one of a definition of a first knowledge component of the knowledge components relating to the first user input or an equation relating to the first knowledge component.

In some embodiments, the first user input corresponds to a first user interaction with a first user interface element in a first user interface, and wherein autocompleting, by the processing device, the annotation to include information relating to one or more of the knowledge components includes presenting the information relating to the one or more knowledge components in the first user interface element in the first user interface.

In some embodiments, autocompleting the annotation to include the information relating to one or more of the knowledge components is responsive to a second user input initiating an autocomplete functionality provided by the processing device.

In some embodiments, autocompleting the annotation to include the information relating to one or more of the knowledge components is responsive to receiving the first user input.

In some embodiments, identifying the one or more knowledge components relating to the first user input includes processing the first user input using a trained machine learning model configured to recognize knowledge components.

In some embodiments, the method further includes: in view of a user request for learning data relating to the first user, presenting a personalized report including information of a first problem set associated with the first user, wherein the first problem set includes at least one annotated practice problem relating to the first user, wherein presenting the personalized report includes: presenting, in a second user interface, first content corresponding to the at least one annotated practice problems relating to the first user; and presenting, in the second user interface, second content corresponding to annotation data association with the at least one annotated practice problems relating to the first user.

In some embodiments, the annotation data includes a message directed from the first user to a second user and a response to the message.

In some embodiments, the annotation data includes the autocompleted annotation including the information of the one or more of the knowledge components.

In some embodiments, the method further includes: presenting, by the processing device, information about a second problem set including one or more recommended practice problems, wherein the one or more recommended practice problems are identified based at least in part on predicted tag information relating to a plurality of known practice problems, and wherein the predicted tag information relating to the plurality of known practice problems includes a plurality of predicted tags associated with a plurality of users and the plurality of known practice problems.

In some embodiments, a non-transitory machine-readable storage medium storing instructions which, when executed, cause a processing device to: receive a first user input providing a portion of an annotation to be associated with a first practice problem and a first user; identify one or more knowledge components relating to the first user input; an autocomplete, by the processing device, the annotation to include information of one or more of the knowledge components, wherein the information of the one or more of the knowledge components includes at least one of a definition of a first knowledge component of the knowledge components relating to the first user input or an equation relating to the first knowledge component.

BRIEF DESCRIPTION OF THE DRAWINGS

The present disclosure is illustrated by way of example, and not by way of limitation, in the figures of the accompanying drawings.

FIG. 9 depicts an example of a user interface for acquiring annotation data in accordance with some embodiments of the present disclosure.

DETAILED DESCRIPTION

Figure 1:
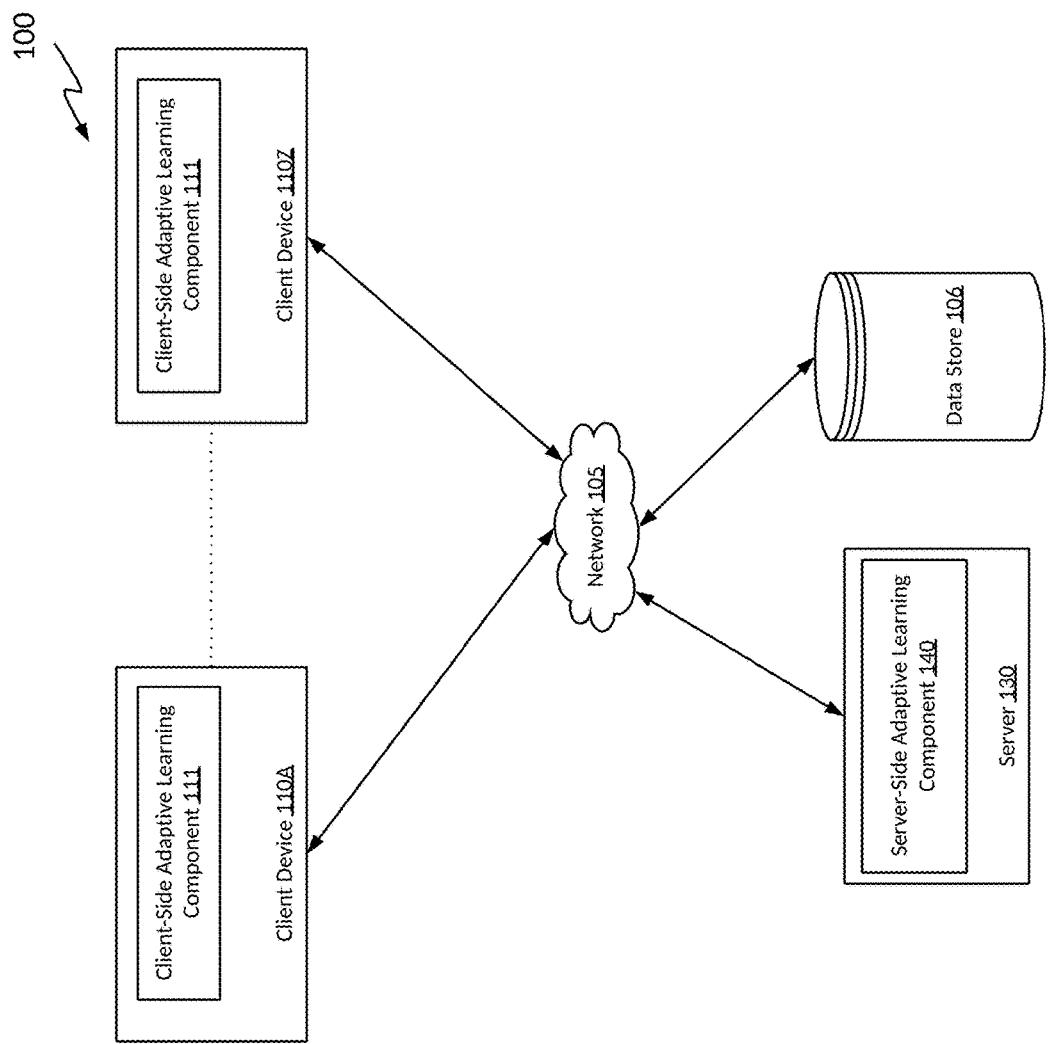
FIG. 1 illustrates an example of a system architecture for providing an adaptive learning system in accordance with some implementations of the present disclosure.

Aspects of the present disclosure relate to adaptive learning systems utilizing machine learning techniques. The adaptive learning systems may provide personalized instructions and assessments to users (e.g., students, teachers, etc.).

Adaptive learning may refer to a technology that uses computer algorithms to respond to a student's interactions in real-time by automatically providing the student with individual support. Prior solutions for adaptive learning systems could mainly be used as a platform for creating assignments to students. For example, teachers may assign a practice problem to a student via an existing adaptive learning system (e.g., by sending online assignments to the student). If the student makes any mistake while solving the problem, the teacher may reassign the mistaken problem to the student. The student may need to provide a revised solution to the teacher. The teacher will then check the revised solution and provide further feedback. If the student wants to make an annotation to the mistaken problem, the student may have to manually enter a text note into the system. The existing adaptive learning system also cannot provide a personalized analysis of the mistake problem for the user without the teacher's efforts. As such, the prior solutions for adaptive learning systems fail to provide computer-implemented mechanisms for performing mistake analysis for student users. The prior solutions for adaptive learning system also could not develop accurate and dynamic machine learning models for adaptive learning given that the prior solutions lack a mechanism for acquiring sufficient training data representing the students' learning progress and do not optimize machine learning mechanisms using real-time learning data of the student users.

To solve the aforementioned and other deficiencies of the prior solutions, aspects of the present disclosure provide mechanisms for providing adaptive learning systems utilizing machine learning techniques. An adaptive learning system according to one or more aspects of the present disclosure may provide learning content to users (e.g., students, teachers, parents, etc.) in the forms of text, animation, slides, video content, audio content, and/or any other suitable content. The learning content may be provided online or offline. The learning content provided to a particular user may relate to one or more educational subjects (e.g., junior high school mathematics) and/or knowledge components pertaining to the particular user. In some embodiments, the learning content provided to the particular user may include practice problems relating to the educational subjects and/or the knowledge components. As referred to herein, a "practice problem" or "problem" may refer to a question or problem that may be analyzed and/or solved using the methods of mathematics, physics, chemistry, science, English, and/or any other educational subject. As referred to herein, a "knowledge component" may be a unit of knowledge relating to one or more educational subjects, such as a concept (e.g., a definition of oval in mathematics), an equation (e.g., a parametric equation of an oval), a theorem, etc. In some embodiments, a knowledge component may relate to and/or be dissolved into one or more other knowledge components. For example, a knowledge component of "oval" may represent knowledge in mathematics relating to ovals to be learned by certain users (e.g., high school students). The knowledge component of "oval" may be dissolved into a knowledge component corresponding to a definition of an oval, a parametric equation representing an oval, a theorem relating to oval (e.g., Segre's theorem), etc.

The adaptive learning system may provide annotation functionalities that enable users to provide personalized annotations pertaining to practice problems. The adaptive learning system may associate the personalized annotations with a respective user providing the annotations and corresponding practice problems. For example, the adaptive learning system may receive one or more user inputs providing annotation data (e.g., text notes, images, audio inputs, video inputs, gestures, etc.) by a first user in connection with a first practice problem. The adaptive learning system may then store the annotation data in association with the first user and the first practice problem.

The adaptive learning system may also acquire tag information of the first problem based on user inputs provided by the first user and may associate the tag information with the first problem and/or the first user. The tag information may include a tag indicative of an importance level assigned to the first problem by the first user (e.g., an importance level ranging from "1" to "5"), a tag indicative of a problem type assigned to the first problem by the first user (e.g., "basic," "advanced," "tricky"), a personalized tag, etc.

The adaptive learning system may use the annotation data and/or the tag information as learning data of the first user to provide adaptive learning services to the first user utilizing machine learning techniques. For example, the adaptive learning system may dynamically update knowledge graphs for the first user and/or other users based on the learning data relating to the first user. A knowledge graph may be a graph structure including information relating to a plurality of knowledge components and their relationships. The information relating to the knowledge components may include names of the knowledge components, descriptions of the components, etc. The knowledge components may include parent knowledge components and sub knowledge components. Each of the parent knowledge components may be dissolved into one or more sub knowledge components that are more specific and targeted. In some embodiments, upon receiving the annotation data to be associated with the first problem and the first user, the adaptive learning system may identify one or more knowledge components relating to the annotation data (e.g., by processing the annotation data using a trained machine learning model). The adaptive learning system may then determine whether a knowledge graph associated with the first user comprises the identified knowledge components. In response to determining that the knowledge graph does not comprise the identified knowledge components, the adaptive learning system may update the knowledge graph to include information of the identified knowledge components (e.g., descriptions of the knowledge components, definitions of the knowledge components, practice problems relating to the knowledge components, equations relating to the knowledge components, etc.).

As another example, the adaptive learning system may provide recommended practice problems to the first user utilizing machine learning techniques in view of the learning data relating to the first user. In some embodiments, the adaptive learning system may identify recommended practice problems for the first user based on predicted tag information relating to a plurality of known problems (e.g., known practice problems with known answers). The predicted tag information relating to the known problems may include predicted tags that are likely to be assigned to the known problems by a plurality of users. The predicted tags may be determined by the adaptive learning system using machine learning techniques. In some embodiments, the adaptive learning system may identify one or more known problems that are associated with predicted tags of predetermined aggregate values as being recommended practice problems (e.g., the greatest aggregate value of predicted tags, the second greatest aggregate value of the predicted tags, etc.).

In some embodiments, the adaptive learning system may provide an autocomplete functionality while obtaining annotation data. For example, the adaptive learning system may receive, via a user interface, a user input including a partial entry of an annotation to be associated with the first problem (e.g., "recall oval"). The adaptive learning system may autocomplete the annotation in the user interface to include information relating to one or more knowledge components pertaining to the user input (e.g., a methodical definition of "oval", a parametric representation of "oval," etc.). To provide the autocomplete functionality, the adaptive learning system may identify the knowledge components pertaining to the user input using a trained machine learning model configured to recognize knowledge components.

FIG. 1 illustrates an example of a system architecture 100, in accordance with one implementation of the disclosure, for providing an adaptive learning system utilizing artificial intelligence technologies. The system architecture 100 includes client devices 110A through 110Z, a network 105, a data store 106, and a server 130. In one implementation, network 105 may include a public network (e.g., the Internet), a private network (e.g., a local area network (LAN) or wide area network (WAN)), a wired network (e.g., an Ethernet network), a wireless network (e.g., an 802.11 network or a Wi-Fi network), a cellular network (e.g., a Long-Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." In some embodiments, each client device 110A through 110Z may be and/or include one or more computer systems 1200 as described in connection with FIG. 12.

Each client device may include a client-side adaptive learning component 111. In one implementation, the client-side adaptive learning components 111 may be applications that allow users to view content, such as images, videos, Web pages, documents, etc. For example, the client-side adaptive learning component 111 may be a web browser that can access, retrieve, present, and/or navigate content (e.g., web pages such as Hypertext Markup Language (HTML) pages, digital media items, etc.) served by a web server. The client-side adaptive learning component 111 may render, display, and/or present the content (e.g., a Web page, video content, audio content, text, etc.) to a user. The client-side adaptive learning component 111 may also include an embedded media player (e.g., a Flash® player or an HTML5 player) that is embedded in a web page (e.g., a web page that may provide information about a product sold by an online merchant). In another example, the client-side adaptive learning component 111 may be a standalone application that can provide various functions as described herein.

The client-side adaptive learning components 111 may be provided to the client devices 110A through 110Z by the server 130. For example, the client-side adaptive learning components 111 may be applications and/or any other software products that are downloaded from the server 130.

The server 130 may be one or more computing devices (e.g., a rackmount server, a server computer, etc.), data stores (e.g., hard disks, memories, databases), networks, software components, and/or hardware components for providing adaptive learning services. In some embodiments, the server 130 may include one or more computer systems 1200 as described in connection with FIG. 12.

The server 130 may include a server-side adaptive learning component 140. In one implementation, the adaptive learning components 111 and 140 may operate together to provide adaptive learning services at the client device 110A-110Z. In other implementations, one or the other of the adaptive learning components 111 and 140 may individually be responsible for providing adaptive learning services at the client device 110A-110Z. In general, functions described in one implementation as being performed by the server 130 can also be performed on the client devices 110A through 110Z in other implementations if appropriate. In addition, the functionality attributed to a particular component can be performed by different or multiple components operating together. The server can also be accessed as a service provided to other systems or devices through appropriate application programming interfaces, and thus is not limited to use in websites.

The client-side adaptive learning component 111 may provide learning content to users (e.g., students, teachers, parents, etc.) in the forms of text, animation, slides, video content, audio content, and/or any other suitable content. The learning content may be provided online or offline. The learning content provided to a particular user may relate to one or more educational subjects (e.g., junior high school mathematics) and/or knowledge components pertaining to the particular user. In some embodiments, the learning content provided to the particular user may include practice problems relating to the educational subjects and/or the knowledge components. The user may submit answers to the practice problems via the user interface provided by the client-side adaptive learning component 111 and/or the server-side adaptive learning component 140.

The client-side adaptive learning component 111 may provide annotation functionalities that enable users to provide personalized annotations pertaining to practice problems. The client-side adaptive learning component 111 may associate the personalized annotations with a respective user and corresponding practice problems. For example, the client-side adaptive learning component 111 may present, to a first user, user interfaces for obtaining annotation data pertaining to a first practice problem (e.g., a math problem). The first practice problem may be any practice problem relating to the first user in any suitable manner, such as a problem to which the first user has provided an incorrect answer, a problem selected by the first user, a problem that the first user is solving using user interfaces provided by the client-side adaptive learning component 111, a problem assigned to the first user (e.g., a student user) by a second user (e.g., a teacher user), etc. The client-side adaptive learning component 111 may receive, via the user interfaces, one or more user inputs providing the annotation data (e.g., text, images, audio inputs, video inputs, etc.). The client-side adaptive learning component 111 may then store the annotation data in association with the first user and/or the first problem. The client-side adaptive learning component 111 may also generate a problem set for the first user. The problem set may include one or more annotated problems, such as the first problem and/or any other practice problem that has been annotated by the first user.

The client-side adaptive learning component 111 may also acquire tag information of the first problem based on user inputs provided by the first user and may associate the tag information with the first problem and/or the first user. The tag information may include a tag indicative of an importance level assigned to the first problem by the first user (e.g., an importance level ranging from "1" to "5" or any other suitable value that may indicate an importance level), a tag indicative of a problem type assigned to the first problem by the first user (e.g., "basic," "advanced," "tricky"), a personalized tag, etc. As will be described in greater detail below, the annotation data and/or the tag information may be used as learning data of the first user to provide adaptive learning services to the first user utilizing machine learning techniques.

In some embodiments, the client-side adaptive learning component 111 may provide an autocomplete functionality while obtaining annotation data. For example, the client-side adaptive learning component 111 may receive, via a user interface, a user input including a partial entry of an annotation to be associate with the first problem (e.g., "recall oval"). The client-side adaptive learning component 111 may autocomplete the annotation in the user interface to include information relating to one or more knowledge components pertaining to the user input (e.g., a mathematical definition of "oval," a parametric representation of "oval"). To provide the autocomplete functionality, the client-side adaptive learning component 111 may identify the knowledge components pertaining to the user input. For example, the client-side adaptive learning component 111 may process the user input using a trained machine learning model configured to recognize knowledge components. As another example, the client-side adaptive learning component 111 may provide the user input to the server-side adaptive learning component 140 for processing. The server-side adaptive learning component 140 may identify the knowledge components and may provide information of the knowledge components to the client-side adaptive learning component 111.

In some embodiments, the adaptive learning components 111 and/or 140 may construct and dynamically update knowledge graphs for users. A knowledge graph may be a graph structure including information relating to a plurality of knowledge components and their relationships. The information relating to the knowledge components may include names of the knowledge components, descriptions of the components, etc. The knowledge components may include parent knowledge components and sub knowledge components. Each of the parent knowledge components may be resolved into one or more sub knowledge components that are more specific and targeted.

Each respective user of client devices 110a-110z may be associated with one or more knowledge graphs including knowledge components pertaining to the user (e.g., knowledge components of one or more educational subjects that the user is learning). The adaptive learning components 111 and/or 140 may update knowledge graphs associated with the user and/or other users based on annotation data provided by the user. For example, upon receiving annotation data to be associated with the first problem and the first user, the adaptive learning components 111 and/or 140 may identify one or more knowledge components relating to the annotation data (e.g., by processing the annotation data using a trained machine learning model). The adaptive learning components 111 and/or 140 may then determine whether a knowledge graph associated with the first user comprises the identified knowledge components. In response to determining that the knowledge graph does not comprise the identified knowledge components, the adaptive learning components 111 and/or 140 may update the knowledge graph to include information of the identified knowledge components (e.g., descriptions of the knowledge components, definitions of the knowledge components, practice problems relating to the knowledge components, equations relating to the knowledge components, etc.).

In some embodiments, the adaptive learning components 111 and/or 140 may provide personalized reports of learning to the users of client devices 110a-110z. For example, a personalized report containing learning data of the first user may include information about one or more practice problems relating to the first user, such as one or more annotated problems associated with annotations provided by the first user, one or more practice problems to which the first user provided incorrect answers, one or more practice problems selected by the first user, one or more problems associated with a certain tag (problems with a certain importance level), by the first user, and/or any other problems that may be regarded as being relating to the first user.

In some embodiments, the adaptive learning components 111 and/or 140 may provide recommended practice problems to users utilizing machine learning techniques. For example, the adaptive learning components 111 and/or 140 may identify recommended practice problems for the first user based on predicted tag information relating to a plurality of known problems. The known problems may be associated with known answers and/or solutions. The predicted tag information relating to the known problems may include a plurality of predicted tags that are likely to be assigned to the known problems by a plurality of users. The predicted tags may be determined by the adaptive learning components 111 and/or 140 using machine learning techniques. In some embodiments, the adaptive learning components 111 and/or 140 may identify one or more known problems that are associated with predicted tags of predetermined aggregate values as being recommended practice problems (e.g., the greatest aggregate value of the predicted tags, the second greatest aggregate value of the predicted tags, etc.). The aggregate value of predicted tags of a known problem may be, for example, a sum of the values of the predicated tags associated with the plurality of known users and the known practice problem, an average of the predicted tags associated with the plurality of known users and the known practice problem, etc.

Further description of the adaptive learning components 111 and 140 and their specific functions are provided in greater detail below with respect to FIG. 2.

Figure 2:
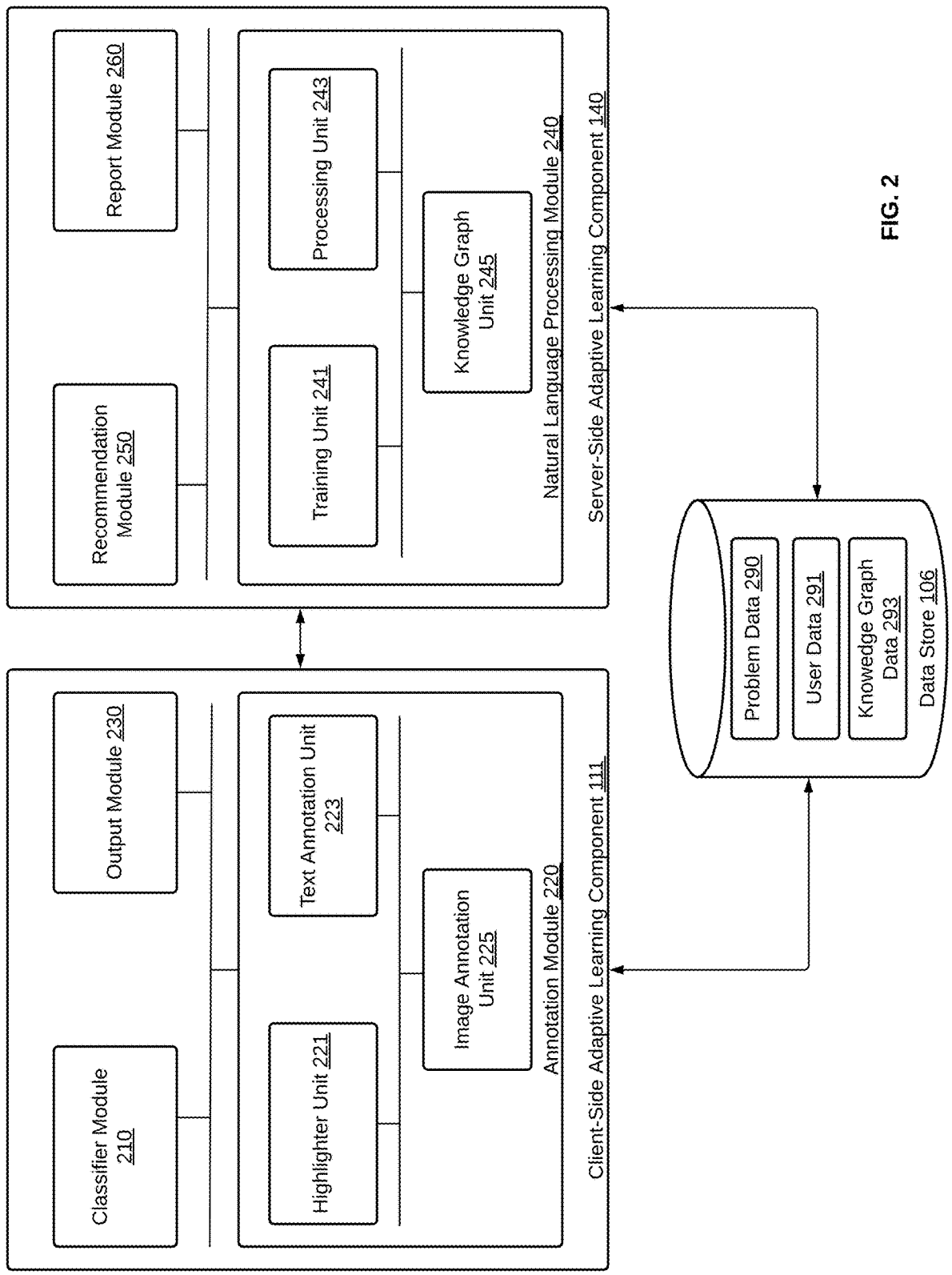
FIG. 2 is a block diagram a client-side adaptive learning component and a server-side adaptive learning component in accordance with some implementations of the present disclosure.

FIG. 2 is a block diagram illustrating a client-side adaptive learning component 111 and a server-side adaptive learning component 140 in accordance with some implementations of the disclosure. The client-side adaptive learning component 111 may be part of a client device, such as client device 110a-110Z of FIG. 1. The client-side adaptive learning component 111 may include a classifier module 210, an annotation module 220, and an output module 230. The annotation module 220 may further include a highlighter unit 221, a text annotation unit 223, and an image annotation unit 225. In some implementations, the client-side adaptive learning component 111 is the same as its counterpart described with respect to FIG. 1. The server-side adaptive learning component 140 may include a natural language processing module 240, a recommendation module 250, and a report module 260. The natural language processing module 240 may further include a training unit 241, a processing unit 243, and a knowledge graph unit 245. In some implementations, the server-side adaptive learning component 140 is the same as its counterpart described with respect to FIG. 1.

More or fewer components may be included in the client-side adaptive learning component 111 and/or the server-side adaptive learning component 140 without loss of generality. For example, two of the modules may be combined into a single module, or one of the modules may be divided into two or more modules. In one implementation, one or more of the modules may reside on different computing devices (e.g., different server computers). The server-side adaptive learning component 140 and the client-side adaptive learning component 111 may be communicatively coupled to each other and to the data store 106. For example, the server-side adaptive learning component 140 and the client-side adaptive learning component 111 may be coupled to each other and the data store 106 via a network (e.g., via network 105 as illustrated in FIG. 1). In another example, the client-side adaptive learning component 111 may be coupled directly to a server where the server-side adaptive learning component 140 resides (e.g., may be directly coupled to server 130).

The classifier module 210 may acquire, store, process, and/or perform other operations on tag information of practice problems. The tag information of a practice problem may include any suitable information relating to one or more tags to be associated with the practice problems, such as a tag indicative of a type of the practice problem (e.g., "basic,"

"advanced," "tricky"), a tag indicative of the importance of the practice problem to one or more users (e.g., an importance level ranging from "1" to "5"), a personal tag defined by a user, etc. In some embodiments, the classifier module 210 may acquire the tag information by receiving user inputs providing the tag information. Examples of the user inputs may include, for example, text inputs, images, audio inputs (e.g., voice messages), gestures, etc. In some embodiments, the classifier module 210 may present one or more user interfaces for acquiring the user inputs (e.g., user interfaces 800, 900, and 1000 of FIGS. 8-10).

Upon receiving tag information provided by a user pertaining to a given practice problem, the classifier module 210 may associate the tag information with the practice problem and/or the user. For example, the classifier module 210 may store the tag information in association with an identifier of the practice problem to associate the tag information with the practice problem. As another example, the classifier module 210 may store the tag information in association with an identifier of a user account of the user to associate the tag information with the user.

The annotation module 220 may provide annotation functionalities. For example, the annotation module 220 may acquire annotation data to be associated with a practice problem and/or a user. The annotation data may include text, images, graphics, video content, audio content, and/or any other suitable content including notes and/or annotations provided by the user in connection with the practice problems. In some embodiments, the annotation module 220 may include multiple components for acquiring various types of annotations. As an example, the highlighter unit 221 may receive user inputs providing data about one or more highlights added to the practice problems by the user, such as a position of the highlights, the color of the highlights, the text highlighted by the user, etc. As another example, the text annotation unit 223 may acquire user inputs providing text notes to be associated with the practice problems. As a further example, the image annotation unit 225 may acquire images including annotation data (e.g., scanned images of notes).

Figure 10:
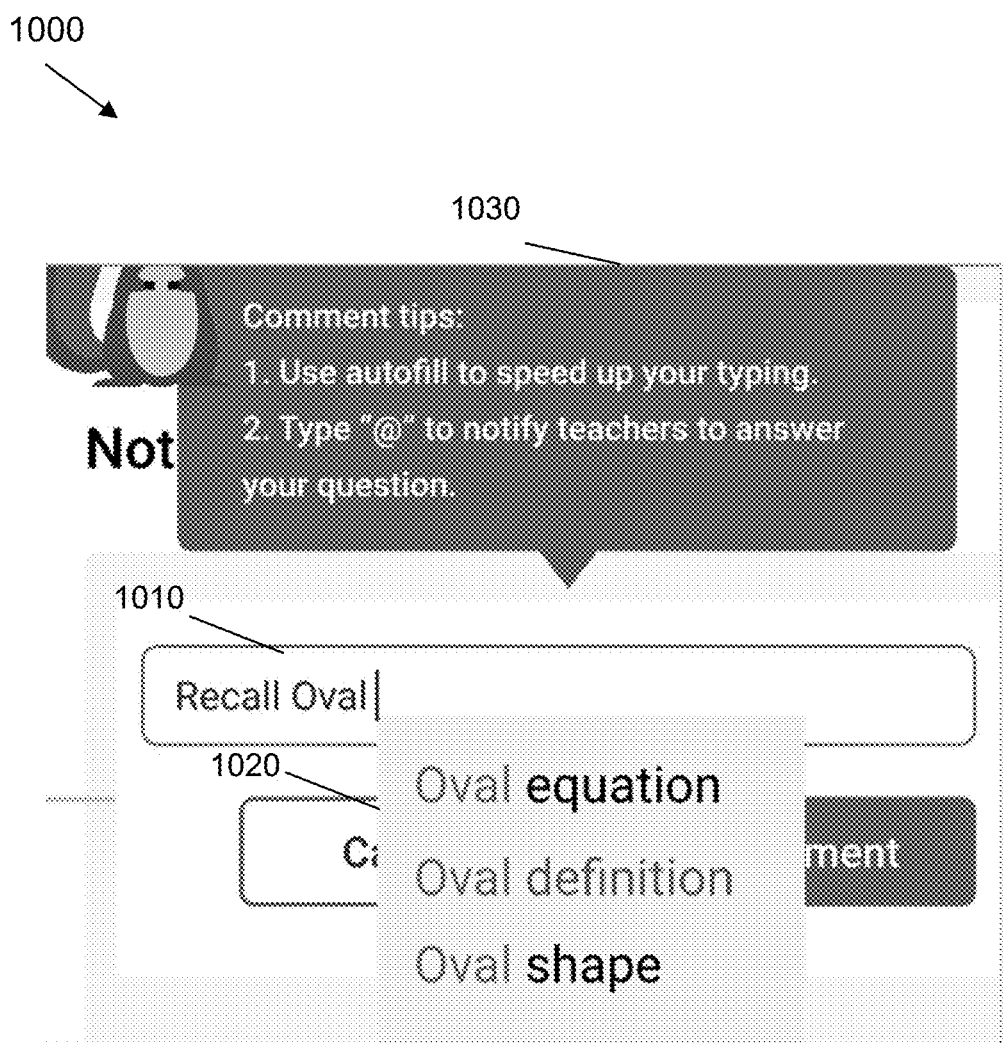
FIG. 10 depicts an example of a user interface for autocompleting annotation data in accordance with some embodiments of the present disclosure.

In some embodiments, the annotation module 220 may also provide an autocomplete functionality when acquiring annotation data. For example, upon receiving a user input providing a portion of an annotation to be associated with a practice problem, the annotation module 220 may autocomplete the annotation to include information of one or more knowledge components relating to the user input, such as descriptions or definitions of the knowledge components. As a more particular example, the annotation module 220 may present a user interface (UI) that may be used to acquire user inputs providing annotation data (e.g., UI 1000 of FIG. 10). Upon receiving a user input (e.g., a text input of "recall oval") via a user interface (UI) element of the user interface (e.g., UI element 1010 as shown in FIG. 10), the annotation module 220 may present a list of knowledge components relating to the user input (e.g., "oval shape," "oval definition," etc. as shown in UI element 1020 of FIG. 10). The annotation module 220 may also prompt the user to use the autocomplete functionality to provide the annotation data (e.g., by presenting a message in the user interface including the prompt). In some embodiments, to provide the list of knowledge components relating to the user input, the annotation module 220 may provide the user input to the natural language processing module 240 for processing. As will be discussed in greater detail below, the natural language processing module 240 may process the user input using a trained machine learning model to identify the knowledge components relating to the user input. The natural language processing module 240 may then provide information relating to the knowledge components to the annotation module 220 for presentation and/or providing the autocomplete functionality.

In some embodiments, the annotation module 220 may receive a user input initiating the autocomplete functionality, such as a selection of one or more of the knowledge components listed in the user interface or any other user interaction with the user interface indicative of a user request to use the autocomplete functionality. In response to receiving the user input initiating the autocomplete functionality, the annotation module 220 may autofill information of the knowledge components relating to the user input in the user interface (e.g., in the UI element via which the user input providing the portion of the annotation was received).

The output module 230 of client-side adaptive learning component 111 may provide audio outputs, video outputs, etc. for providing adaptive learning services in accordance with various embodiments of the present disclosure. For example, the output module may generate and/or present user interfaces for acquiring learning data (e.g., annotation data, tag information, etc.), presenting personalized reports of learning data, providing recommended practice problems, etc. As another example, the output module 230 may provide printing functionalities that enable users to print content of problems, content of solutions to the problems, annotation data, etc. The print functionalities may be provided online or offline.

The natural language processing module 240 may process and/or analyze the tag information provided by the classifier module 210, the annotation data provided by the annotation module 220, and/or any other learning data of users using natural language processing techniques.

The natural language processing module 240 may include a training unit 241 that can train a machine learning module for knowledge component recognition. The machine learning model may refer to the model artifact that is created by the training unit 241 using training data that includes training inputs and corresponding target outputs (known outputs corresponding to respective training inputs). The training unit 241 may find patterns in the training data that map the training input to the target output (the output to be predicted) and may generate the machine learning model that captures these patterns. As an example, the machine learning model may be composed of a single level of linear or non-linear operations (e.g., a support vector machine [SVM]).

As another example, the machine learning model may be a deep network composed of multiple levels of non-linear operations. The deep network may include, for example, a neural network with one or more hidden layers. Training the neural network may include, for example, adjusting weights of the neural network in accordance with a backpropagation learning algorithm or any other suitable learning algorithm. For example, the training unit 241 may obtain training data including one or more training inputs comprising texts of solutions to a plurality of practice problems and/or texts of the practice problems. The training inputs may be and/or include text corpora including texts of the solutions to the practice problems. The training data may further include training outputs representing known knowledge components, such as texts of the known knowledge components, numerical values corresponding to the known knowledge components (e.g., word embeddings that map distinct words to high-dimensional feature vectors), etc. In some embodiments, the training unit 241 may convert the training data into numerical values. The numerical values representing the training inputs may be input to the neural network, and output values (e.g., numerical values associated with target outputs) of the input/output mapping are stored in the output nodes of the neural network. The connection weights in the neural network are then adjusted in accordance with a learning algorithm (e.g., backpropagation, etc.), and the learning process may be repeated for the other input/output mappings in the training set.

In some embodiments, the machine learning model may be and/or include a named-entity recognition (NER) model trained for recognizing named entities in texts that correspond to knowledge components. The NER model may be trained using deep learning techniques in some embodiments. For example, the NER model may include a first component for converting the training data into corresponding vector representations (e.g., word embeddings mapping distinct words to high-dimensional feature vectors). In some embodiments, the training data may include a tagged corpus comprising a collection of documents that contain annotations of one or more entity types ("knowledge component," "sub knowledge component," "non-knowledge component," etc.). The NER model may include a second component for encoding sequence context information for capturing contextual dependencies for tag decoder (e.g., a bidirectional LSTM (long short-term memory) network). The NER model may include a third component for predicting labels for words in the given sequence (e.g., a conditional random field layer).

Once the machine learning model is trained, it can be used to process and/or analyze learning data associated with one or more users (e.g., annotation data, tag information, etc. associated with student users). For example, the processing unit 243 may identify knowledge components relating to annotation data provided by the annotation module 220 using the trained machine learning model. More particularly, for example, the processing unit 243 may provide the annotation data as input to the trained machine learning model and runs the trained machine learning model on the input to obtain one or more outputs. The outputs may include, for example, numerical values and/or texts corresponding to the knowledge components in the annotation data. The processing unit 243 may identify the knowledge components relating to the annotation data based on the outputs of the trained machine learning model.

In some embodiments, the trained machine learning model may be used in a real-time manner to predict knowledge components when a user is providing annotation data. For example, the user may provide the annotation data (e.g., a text annotation) using one or more user interfaces provided by the annotation module 220. The annotation module 220 may provide the annotation data provided by the user to the natural language processing module 240. The natural language processing module 240 (e.g., the processing unit 243) may process the annotation data using the trained machine learning model as described above and may provide information of the identified knowledge components to the annotation module 220. As another example, the annotation module 220 may use the trained machine learning model to process the annotation data once it receives the annotation data. The annotation module 220 may then identify the knowledge components relating to the annotation data based on the outputs of the trained machine learning model.

The natural language processing module 240 may further include a knowledge graph unit 245 for constructing, updating, managing, etc. knowledge graphs. Each of the knowledge graphs may be a graph structure including information relating to a plurality of knowledge components and their relationships. The information relating to the knowledge components may include names of the knowledge components, descriptions of the components, equations relating to the knowledge components, problems relating to the knowledge components, etc. The knowledge components may include parent knowledge components and sub knowledge components. Each of the parent knowledge components may be resolved into one or more sub knowledge components that are more specific and targeted.

To construct the knowledge graph, the knowledge graph unit 245 may identify a plurality of knowledge components, such as the knowledge components contained in the training data used to train the machine learning model for knowledge component recognition. The knowledge graph unit 245 may acquire information relating to the identified knowledge components for constructing the knowledge graph. In some embodiments, the knowledge graph unit 245 may search the information in a database storing data relating to knowledge components. Alternatively or additionally, the knowledge graph unit 245 may perform an internet search for the information relating to the identified knowledge components. For example, the knowledge graph unit 245 may generate a search query and extract content and/or structured data from web pages including the information of the knowledge components based on presentation structures.

The knowledge graph unit 245 may construct a knowledge graph using the acquired information relating to the identified knowledge components. For example, the knowledge graph unit 245 may determine relationships (e.g., logical and cognitive relationships) that may connect the identified knowledge components and may generate a graph structure recording the relationships. The graph structure may include a plurality of nodes corresponding to the knowledge components and edges corresponding to the relationships that may connect the knowledge components.

The knowledge graph unit 245 may update the knowledge graph based on annotation data provided by the annotation module 220. For example, the knowledge graph unit 245 may receive, from the processing unit 243, information about one or more knowledge components relating to the annotation data (e.g., descriptions of the knowledge components). The knowledge graph unit 245 may determine whether the knowledge graph includes the one or more knowledge components relating to the annotation data. In response to determining that the knowledge graph does not include the knowledge components relating to the annotation data, the knowledge graph unit 245 may update the knowledge graph to include information of the knowledge components relating to the annotation data.

The recommendation module 250 may provide personalized practice problem recommendations to users based on learning data of the users. For example, the recommendation module 250 may determine one or more recommended practice problems for a first user based on information of a first practice problem relating to the first user. The first practice problem may be a practice problem selected by the first user, an annotated problem associated with annotation data provided by the first user, and/or any other suitable practice problems that may be regarded as being relating to the first user. As an example, the recommendation module 250 may identify the recommended practice problems in view of a determination that the first practice problem and the recommended practice problems are associated with one or more common knowledge components. The knowledge components may be identified by the natural language processing module 240 as described above (e.g., by processing text of the practice problems and/or solutions to the practice problems using the trained machine learning model for knowledge component identification).

As another example, the recommendation module 250 may identify the recommended practice problems based on the tag information associated with the first practice problem and tag information associated with one or more other practice problems. In one implementation, the recommendation module 250 may identify the recommended practice problems in view of a determination that the recommended practice problems and the first problem share common tag information (e.g., having the same importance level, the same problem type, etc.).

In another implementation, the recommendation module 250 may identify the recommended practice problems based on predicted tags that are likely to be assigned to a plurality of known problems by a plurality of known users. For example, the recommendation module 250 may identify one or more known problems that are associated with predicted tags of predetermined aggregate values as being recommended practice problems (e.g., the greatest aggregate value of predicted tags, the second greatest aggregate value of the predicted tags, etc.). The aggregate value of predicted tags of a known problem may be, for example, a sum of the values of the predicated tags associated with the plurality of known users and the known practice problem, an average of the predicted tags associated with the plurality of known users and the known practice problem, etc.

In some embodiments, the recommendation module 250 may predict tag values that are likely to be assigned by the known users to the known problems based on a matrix that approximates the predicted tags associated. For example, the recommendation module 250 may initialize a first matrix representing data relating to the known users. A first dimension of the first matrix may correspond to the known users. A second dimension of the first matrix may correspond to information relating to the known users. Each element in the first matrix may represent information relating to a respective user. In some implementations, the first matrix may be represented as an m×k matrix approximating k pieces of information relating to m users.

The recommendation module 250 may initialize a second matrix representing data relating to the known practice problems. A first dimension of the second matrix may correspond to the known practice problems. A second dimension of the second matrix may correspond to information relating to the known practice problems. Each element in the second matrix may represent information relating to a respective known practice problem. In some implementations, the first matrix may be represented as a k×n matrix approximating k pieces of information relating to n practice problems.

The recommendation module 250 may initialize a third matrix representing predicted tags that are likely to be assigned to the known practice problems by the known users. The third matrix may be a matrix product of the first matrix and the second matrix. The recommendation module 250 may perform machine learning to learn the first matrix and the second matrix that minimize the difference between the third matrix and training data representing known tags assigned to the known practice problems by the known users. The training data may be sparse data that includes tags assigned to some of the known problems by the known users but does not include tags assigned to each of known problems by each of the known users.

Performing the machine learning process may include optimizing a loss function measuring the similarity between the third matrix and the training data representing known tags assigned by known users (e.g., using a stochastic gradient descent algorithm, an alternating least squares (ALS) algorithm, and/or any other suitable optimization algorithm).

The report module 260 may provide personalized reports of learning data of users. For example, the report module 260 may generate a personalized report containing learning data of a first user. The learning data of the first user may include, for example, information about one or more practice problems relating to the first user, such as one or more annotated problems associated with annotations provided by the first user, one or more practice problems to which the first user provided incorrect answers, one or more problems selected by the first user, one or more problems assigned to the first user (a student user) by a second user (e.g., a teacher user), and/or any other practice problems that may be regarded as being relating to the first user. The information about a given practice problem relating to the first user may include, for example, text and other content including the practice problems, text and/or other content presenting a solution to the practice problems, content corresponding to an answer to the practice problems, content corresponding to an answer provided by the first user, annotation data associated with the practice problems, etc. In some embodiments, the report module 260 may generate one or more user interfaces for presenting the personalized report of the user (e.g., UI 1100 of FIG. 11). The report module 260 may provide data for presenting the user interfaces to output module 230. Output module 230 may then present the user interfaces using the received data.

The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 may store practice problem data 290, user data 291, knowledge graph data 293, and/or any other data that can be used to provide adaptive learning systems in accordance with the present disclosure. The practice problem data 290 may include any data relating to one or more practice problems. Examples of data relating to a practice problem may include an identifier of the practice problem, one or more knowledge components relating to the practice problem, tag information associated with the practice problem, annotation data associated with the practice problem, etc. The user data 291 may include any data relating to one or more users. Examples of data relating to a user may include an identifier of the user, learning data of the user, tag information of one or more practice problems relating to the user, annotation data, etc. The knowledge graph data 293 may include one or more knowledge graphs as described herein.

Figure 3:
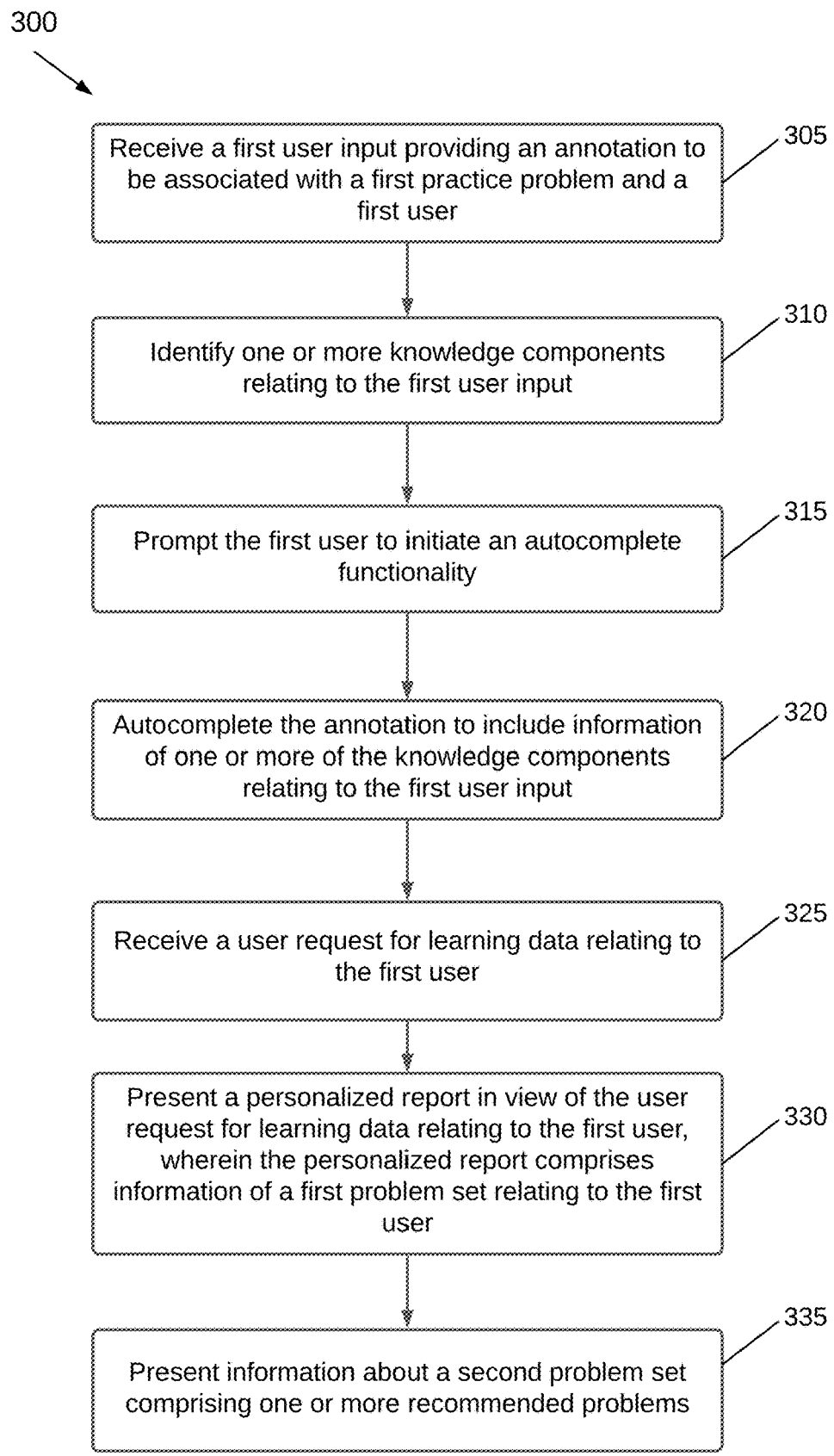
FIG. 3 is a flow diagram illustrating a method for providing an adaptive learning system by a client device according to some implementations of the present disclosure.

FIG. 3 is a flow diagram illustrating a method 300 for providing an adaptive learning system by a client device according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one implementation, method 300 may be performed by a processing device executing the client-side adaptive learning component 111 as shown in FIGS. 1 and 2.

Method 300 may begin at block 305 when the processing device receives a first user input providing an annotation to be associated with a first practice problem and a first user. The first user input may be and/or include a text input, an audio input, a video input, one or more gestures, etc. In some embodiments, the first user input may correspond to a first user interaction with a first user interface element in a first user interface configured to acquire annotation data (e.g., the UI element 1010 of UI 1000 as described in connection with FIG. 10). The first user interaction may be, for example, entering content providing a portion of the annotation in the first user interface element (e.g., entering the text of "recall oval").

At block 310, the processing device may identify one or more knowledge components relating to the first user input. For example, the processing device may process the first user input using a trained machine learning model configured to generate one or more outputs indicating knowledge components included in inputs provided to the trained machine learning model and/or knowledge components relating to the inputs. In some embodiments, the processing device may process the user inputs using the natural language processing module 240 of FIG. 2.

As another example, the processing device may provide the first user input to a computing system that is capable of processing the first user input to identify the knowledge components relating to the first user input (e.g., a computing system executing the natural language processing module 240). The computing system may process the first user input and may provide information of the identified knowledge components to the processing device for presentation.

In some embodiments, at block 315, the processing device may prompt the first user to initiate an autocomplete functionality. For example, the processing device may present, on a display, a list of the one or more knowledge components relating to the first user input in the first user interface or any other suitable user interface. The list of the knowledge components may be presented, for example, in a second UI element in the first user interface (e.g., the UI element 1020 of UI 1000 as illustrated in FIG. 10). The processing device may also present a message prompting the first user to initiate the autocomplete feature (e.g., a message 1030 of UI 1000 as illustrated in FIG. 10).

At block 320, the processing device may autocomplete the annotation to include information of one or more of the knowledge components relating to the first user input. For example, the processing device may present the information of one or more of the identified knowledge components in the first user interface element of the first user interface. The information of the one or more of the knowledge components may include a definition of a first knowledge component relating to the first user input (e.g., a knowledge component selected by the user), an equation relating to the first knowledge component, etc. In some embodiments, the processing device may autocomplete the annotation by automatically including information about each of the knowledge components relating to the first user input in the annotation and store the autocompleted annotation in association with the first user and/or the first problem.

In some embodiments, the processing device may autocomplete the annotation in response to receiving a second user input initiating the autocomplete functionality. The second user input may correspond to a user interaction with the second element (e.g., a user selection of one or more of the listed knowledge components). In some embodiments, the processing device may autocomplete the annotation in response to receiving the first user input.

At block 325, the processing device may receive a user request for learning data relating to the first user. The user request may include information about one or more filter options to be applied to a plurality of practice problems relating to the first user, such as annotated problems associated with annotations provided by the first user, mistaken problems that the first user has provided incorrect answers or solutions, etc. The filter options may include, for example, a first filter option for filtering the practice problems relating to the first user based on knowledge components, a second filter option for filtering the practice problems relating to the first user based on tag information, a third filter option for filtering the annotated practice problems relating to the first user based on time information (e.g., creation times, last modified times), etc. The user request may correspond to one or more user interactions with a second user interface (e.g., UI 1100 of FIG. 11) that provides the filter options.

At block 330, the processing may present a personalized report in view of the user request for learning data relating to the first user. In some embodiments, the personalized report may be presented by presenting one or more user interfaces on a display. The personalized report may include information of a first problem set associated with the first user. The first problem set may include one or more annotated practice problems relating to the first user and/or one or more other practice problems relating to the first user. The first problem set may be determined by applying the filter options provided by the user request to the practice problems relating to the first user. The information about the one or more annotated practice problems may include annotations provided by the first user in association with the one or more annotated practice problems. In some embodiments, the information about the annotated practice problems may be presented in the second user interface (e.g., UI 1100 of FIG. 11).

At block 335, the processing device may present information about a second problem set comprising one or more recommended practice problems. The one or more recommended practice problems may be identified based at least in part on tag information relating to the first practice problem and/or predicted tag information relating to a plurality of known practice problems. The tag information relating to the first practice problem may include an importance level assigned to the first practice problem by the first user, a problem type assigned to the first practice problem by the first user, etc. The predicted tag information relating to the known practice problems may include a plurality of predicted tags that are likely to be assigned to the known practice problems by a plurality of users. The predicted tags may be determined by performing one or more operations described in connection with FIG. 7 below.

Figure 4A:
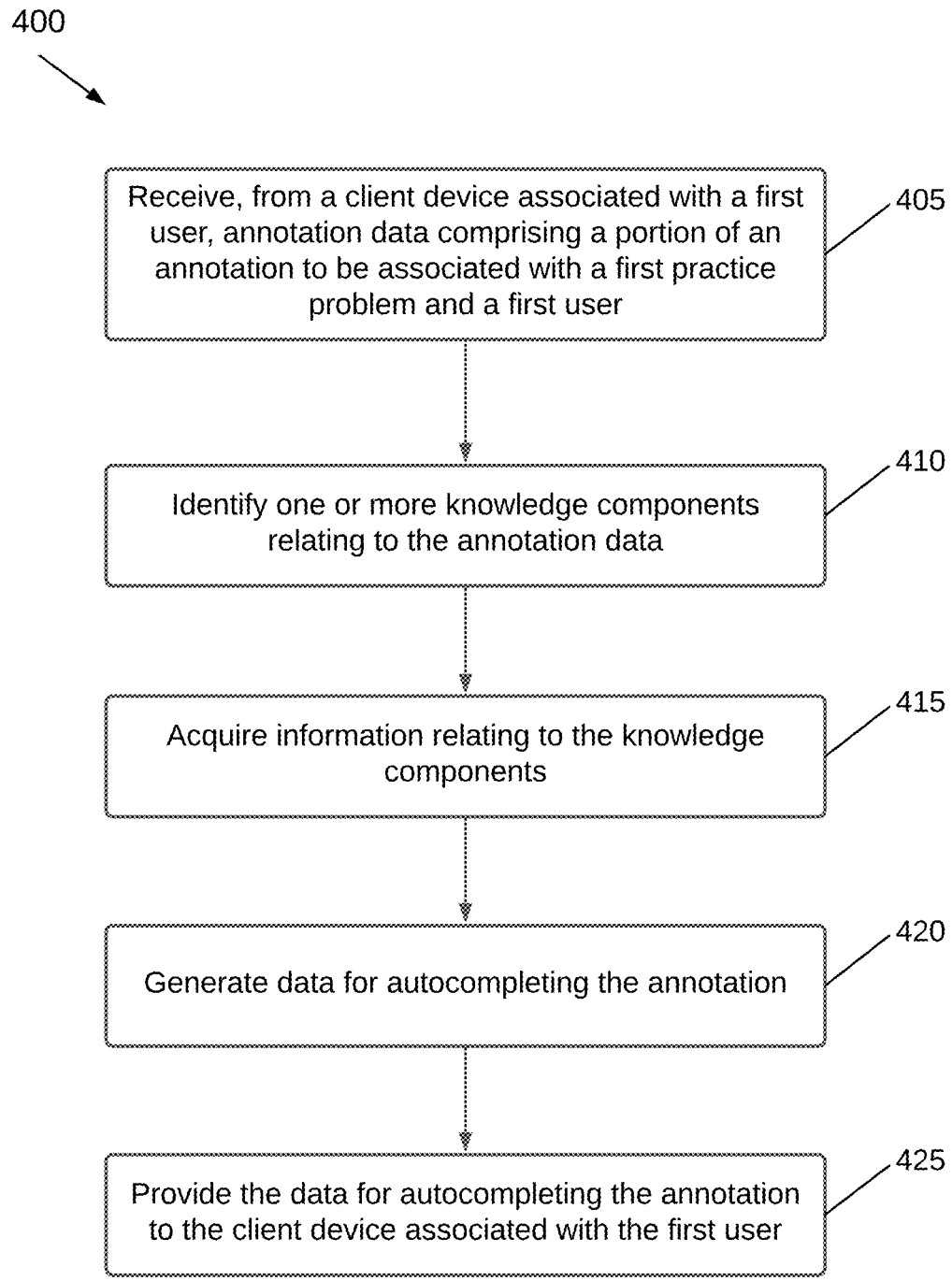
FIGS. 4A and 4B are flow diagrams illustrating methods for providing an adaptive learning system by a server device according to some implementations of the present disclosure.
Figure 4B:
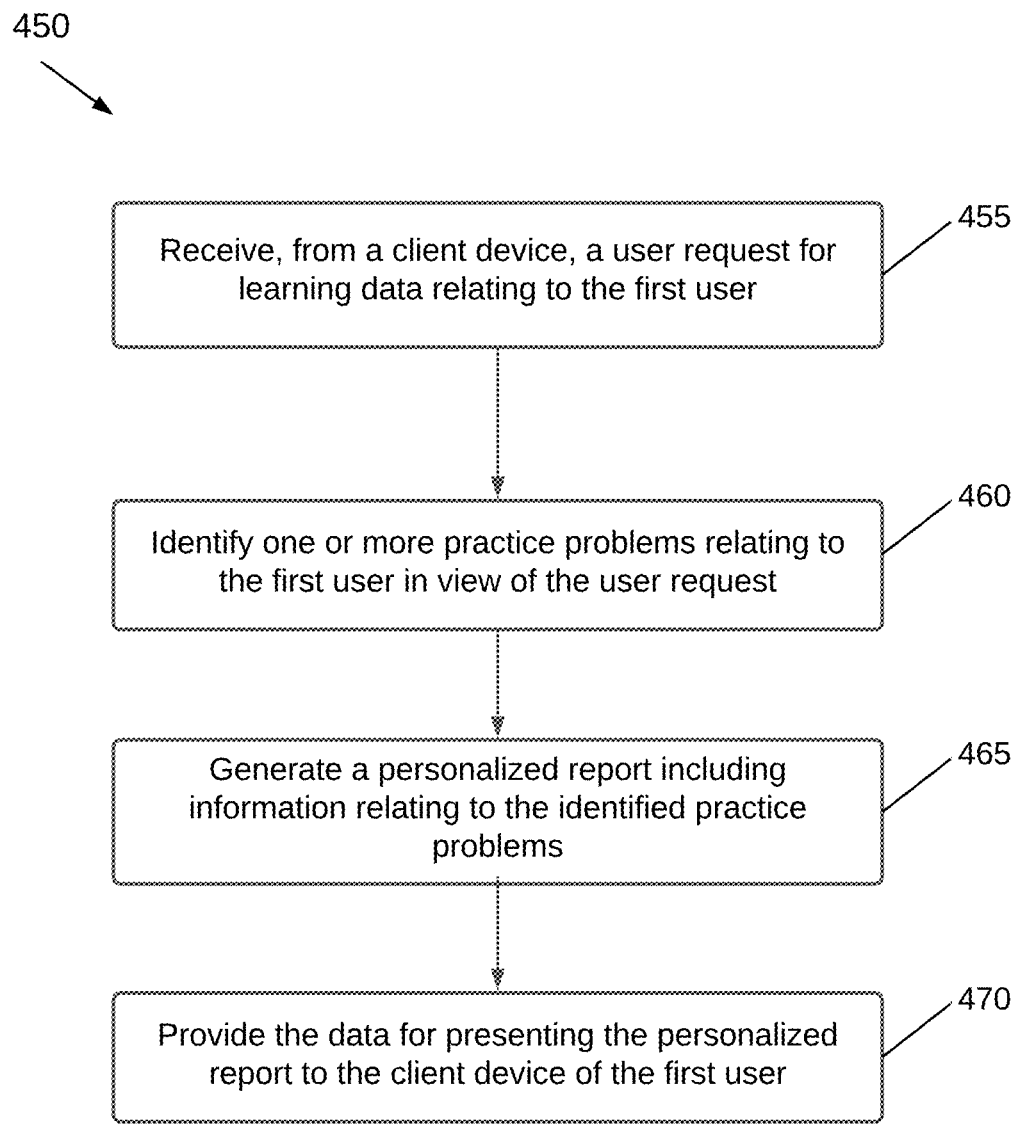

FIGS. 4A and 4B are flow diagrams illustrating methods 400 and 450 for providing an adaptive learning system by a server device according to some implementations of the disclosure. The methods 400 and 450 may be performed by processing logic that comprises hardware (e.g., circuitry, dedicated logic, programmable logic, microcode, etc.), software (e.g., instructions run on a processing device to perform hardware simulation), or a combination thereof. In one implementation, methods 400 and 450 may be performed by a processing device executing the server-side adaptive learning component 140 as shown in FIGS. 1 and 2.

Method 400 may begin at block 405 when the processing device receives, from a client device associated with a first user, annotation data comprising a portion of an annotation to be associated with a first practice problem and a first user. For example, the annotation data may include a first user input providing the portion of the annotation (e.g., an incomplete or partial entry of the annotation). The first user input may be and/or include a text input, an audio input, one or more gestures, etc. In some embodiments, the first user input may correspond to a first user interaction with a first user interface element in a first user interface configured to acquire annotation data (e.g., the UI element 1010 of UI 1000 as described in connection with FIG. 10). The first user interaction may be, for example, entering content providing a portion of the annotation in the first user interface element (e.g., an entry of the text of "recall oval").

At 410, the processing device may identify one or more knowledge components relating to the annotation data. For example, the processing device may process the first user input using a trained machine learning model configured to generate one or more outputs indicating knowledge components in inputs provided to the trained machine learning model and/or knowledge components relating to the inputs. In some embodiments, the processing device may process the user inputs using the natural language processing module 240 of FIG. 2.

At block 415, the processing device may acquire information relating to the knowledge components. For example, the processing device may search the information in a database storing data relating to knowledge components (e.g., definitions, equations, parametric representations, etc. of the knowledge components). In some embodiments, the processing device may retrieve the information relating to the knowledge components from a knowledge graph associated with the first user. As another example, the knowledge graph unit 245 may perform an internet search for the information relating to the identified knowledge components (e.g., by generating a search query for the information, extracting content from web pages containing the information, etc.).

At block 420, the processing device may generate data for autocompleting the annotation. The data for autocompleting the annotation may include data for presenting one or more portions of the information relating to the knowledge components in the user interface via which the annotation data was acquired (e.g., the first user interface). As an example, the data for autocompleting the annotation may include data for presenting a definition of a first knowledge component relating to the first user input (e.g., a knowledge component selected by the user), an equation relating to the first knowledge component, etc. in the first user element of the first user interface. As another example, the data for autocompleting the annotation may include data to be used to present information about each of the knowledge components relating to the first user input in the first user interface element of the first user interface.

At block 425, the processing device may provide the data for autocompleting the annotation to the client device associated with the first user. The data may be provided to the computing device via any suitable communication protocol.

Method 450 may begin at block 455 when the processing device receives, from a client device, a user request for learning data relating to the first user. In one implementation, the client device may be associated with the first user. In another implementation, the client device may be associated with a second user that is authorized to access the first user's learning data (e.g., a teacher user). The user request may include one or more filter options to be applied to a plurality of practice problems relating to the first user, such as annotated problems associated with annotations provided by the first user, mistaken problems that the first user has provided incorrect answers or solutions, etc. The filter options may include, for example, a first filter option for filtering the practice problems relating to the first user based on knowledge components, a second filter option for filtering the practice problems relating to the first user based on tag information, a third filter option for filtering the practice problems relating to the first user based on time information (e.g., creation times, last modified times), etc. The user request may correspond to one or more user interactions with a second user interface (e.g., UI 1100 of FIG. 11) that provides the filter options.

At block 460, the processing device may identify one or more practice problems relating to the first user in view of the user request. For example, the processing device may select, from a plurality of annotated practice problems associated with the first user, one or more annotated practice problems in view of one or more filter options. As another example, the processing device may select, from a plurality of mistaken problems associated with the first user, one or more annotated practice problems in view of one or more filter options.

At block 465, the processing device may generate a personalized report including information relating to the identified practice problems. The personalized report may include information of the identified practice problems, such as annotations provided by the first user in association with the identified practice problems, content presenting the identified practice problems, content presenting solutions to the identified practice problems, etc.

At block 470, the processing device may provide the data for presenting the personalized report to the client device of the first user. The data for presenting the personalized report may include data for presenting one or more user interfaces for presenting the personalized report (e.g., UI 1100 of FIG. 11).

Figure 5A:
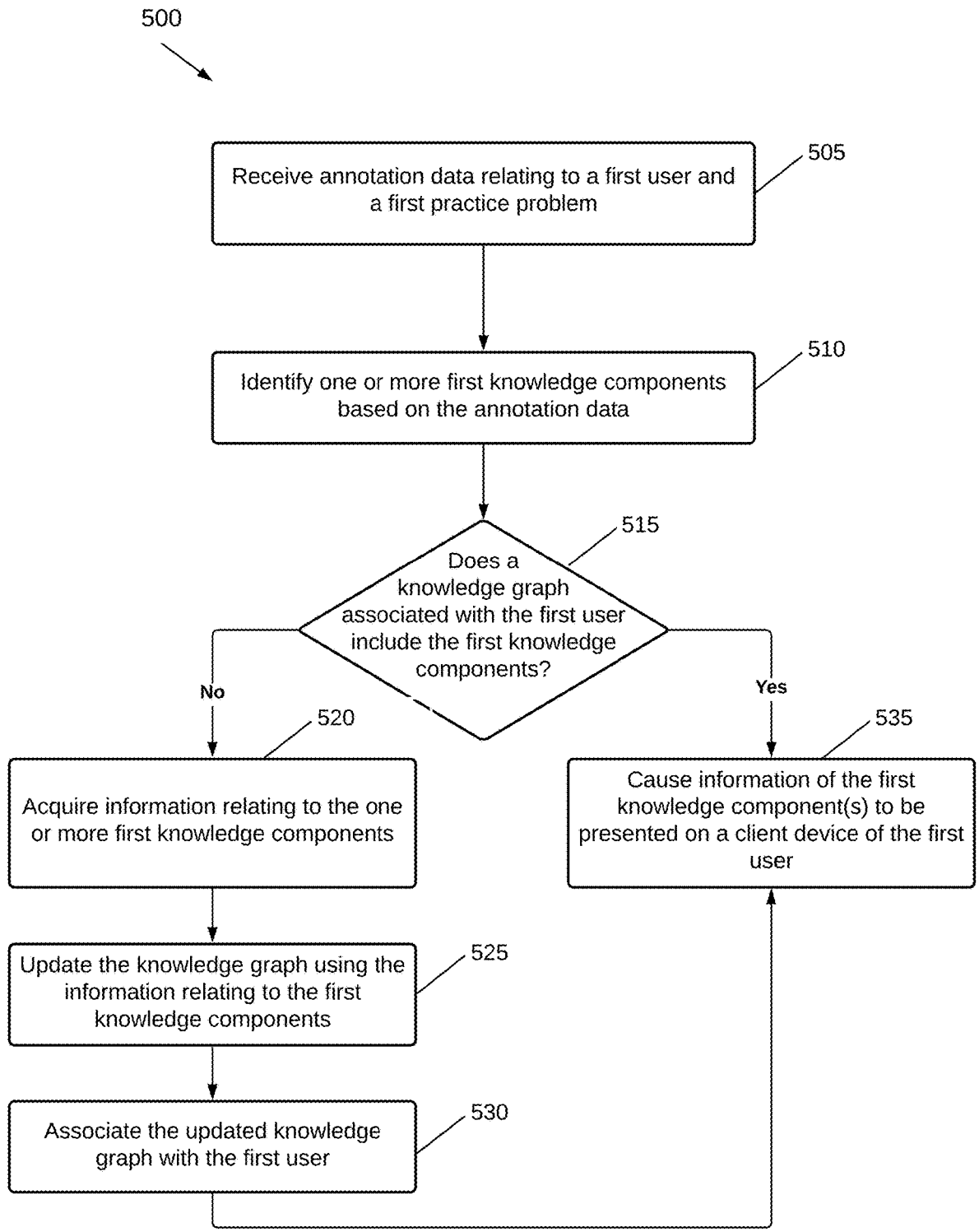
FIG. 5A is a flow diagram illustrating a method for dynamically updating a knowledge graph according to some implementations of the present disclosure.

FIG. 5A is a flow diagram illustrating a method 500 for dynamically updating a knowledge graph according to some implementations of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by a processing device executing the natural language processing module 240 as shown in FIG. 2.

Method 500 may begin at block 505 when the processing device receives annotation data relating to a first user and a first practice problem. The annotation data may include any suitable content representing an annotation and/or one or more portions of an annotation, such as text, images, graphics, audio content, video content, etc. As an example, the annotation data may include a portion of an annotation to be associated with the first user and the first practice problem (e.g., a partial entry of a text annotation). As another example, the annotation data may include highlights of text of the first practice problem, a question directed to a second user relating to the first practice problem, etc.

At block 510, the processing device may identify one or more first knowledge components based on the annotation data. For example, the processing device may process the user inputs using a trained machine learning model to identify the knowledge components. The trained machine learning model is configured to generate one or more outputs indicating knowledge components included in the user inputs and/or knowledge components relating to the user inputs. As another example, the processing device may provide the user inputs to a computer system that is capable of identifying knowledge components relating to the user inputs (e.g., a computing system executing the natural language processing module 240 of FIG. 2).

At block 515, the processing device may determine whether a knowledge graph associated with the first user includes the one or more first knowledge components. The knowledge graph may be a graph structure including information relating to a plurality of knowledge components (also referred to as the "second plurality of knowledge components") and their relationships. The knowledge graph may be constructed by performing one or more operations as described in connection with FIG. 5B below.

In some embodiments, in response to determining that the knowledge graph associated with the first user does not include the one or more first knowledge components ("No" at block 515), the processing device can proceed to block 520. At block 520, the processing device may acquire information relating to the one or more first knowledge components. For example, the processing device may retrieve the information of the knowledge components form the knowledge graph. As another example, the processing device may perform an internet search for the information relating to the one or more first knowledge components.

At block 525, the processing device may update the knowledge graph using the information relating to the first knowledge components.

At block 530, the processing device may associate the updated knowledge graph with the first user. For example, the processing device may store the updated knowledge graph in association with an identifier of a user account of the first user.

At block 535, the processing device may cause the information of the first knowledge component(s) to be presented on a client device of the first user. For example, the processing device can provide data for presenting one or more user interfaces including the information of the first knowledge component(s) to the client device of the first user. As another example, the processing device may provide, to the client device of the first user, data for autocompleting the annotation data to include the information of the first knowledge component(s). More particularly, for example, the annotation data may be received via one or more user interactions with a first UI element of a first user interface. The processing device may provide, to the client device of the first user, data for presenting the information of one or more of the first knowledge components in the first UI element.

In some embodiments, the processing device may determine that the knowledge graph associated with the first user includes the one or more first knowledge components ("YES" at block 515). In view of the determination, the processing device may proceed to block 535 and may cause the information of the first knowledge component(s) to be presented on the client device of the first user.

Figure 5B:
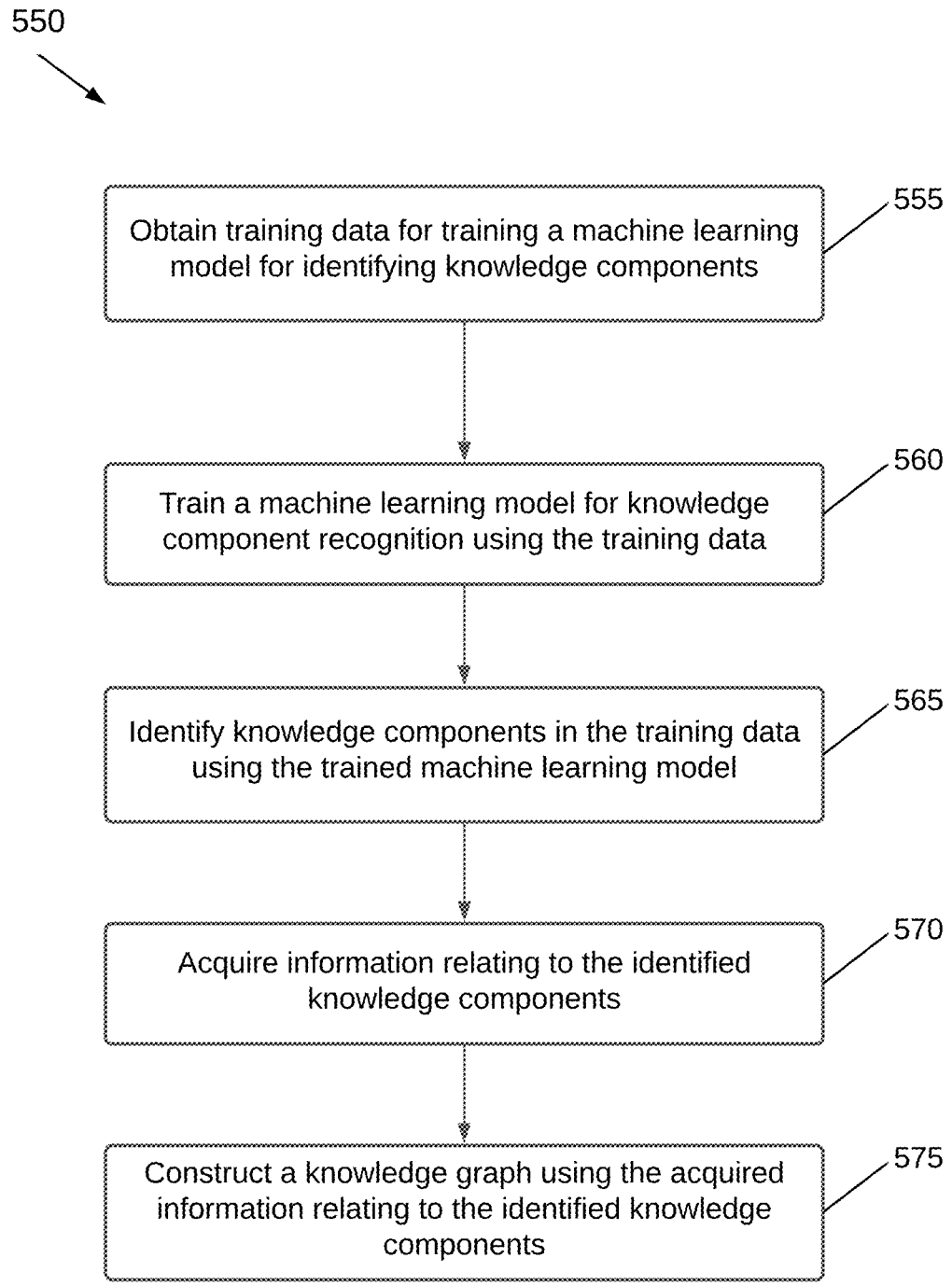
FIG. 5B is a flow diagram illustrating a method for constructing a knowledge graph according to some implementations of the present disclosure.

FIG. 5B is a flow diagram illustrating a method 550 for constructing a knowledge graph according to some implementations of the present disclosure. The method 550 may be performed by processing logic that comprises hardware (e.g., circuitry, dedicated logic, programmable logic, microcode, etc.), software (e.g., instructions run on a processing device to perform hardware simulation), or a combination thereof. In one implementation, method 550 may be performed by a processing device executing the natural language processing module 240 as shown in FIG. 2.

Method 550 may begin at block 555 when the processing device obtains training data for training a machine learning model for identifying knowledge components. The training data may be and/or include training inputs including the text of solutions to the practice problems. The training data may also include target outputs representing known knowledge components (e.g., text or numerical values of the known knowledge components).

At block 560, the processing device may train a machine learning model for knowledge component recognition using the training data. For example, the processing device may provide input values of a given input/output mapping (e.g., numerical values associated with training inputs) as input to a neural network to be employed for identifying knowledge components, and output values (e.g., numerical values associated with target outputs corresponding to known knowledge components) of the input/output mapping are stored in the output nodes of the neural network. The connection weights in the neural network may then be adjusted in accordance with a learning algorithm (e.g., backpropagation, etc.). The procedure may be repeated for the other input/output mappings in that training data. The machine learning model may be trained by executing the training unit 241 of FIG. 2 in some embodiments.

At block 565, the processing device may identify knowledge components in the training data using the trained machine learning model. For example, the processing device may process the training data using the trained neural network to generate outputs corresponding to the knowledge components in the training data.

At block 570, the processing device may acquire information relating to the identified knowledge components, such as a definition of each of the knowledge components, an equation defining the knowledge components, etc. For example, the processing device may search the information in a database storing data relating to knowledge components. As another example, the processing device may perform an internet search for the information relating to the identified knowledge components.

At block 575, the processing device may construct a knowledge graph using the acquired information relating to the identified knowledge components. For example, the processing device may create a graph structure comprising a plurality of nodes and a plurality of edges connecting the nodes and may store the information relating to the identified knowledge components in the graph structure. Each of the nodes may correspond to one of the identified knowledge components. The edges may represent relationships between the knowledge components. For example, an edge connecting a pair of nodes (e.g., a first node corresponding and a second node of the knowledge graph) may represent the relations between the knowledge components corresponding to the pair of nodes (e.g., a first knowledge component corresponding to the first node and a second knowledge component corresponding to the second node). A given node of the knowledge graph may be connected to one or more nodes of the knowledge graph by one or more edges. The relationships between the identified knowledge components may be determined, for example, using one or more neural networks trained to extract relation and/or dependency data from text containing knowledge components. In some embodiments, the neural networks may include one or more convolutional neural networks, recurrent neural networks, etc.

Figure 6:
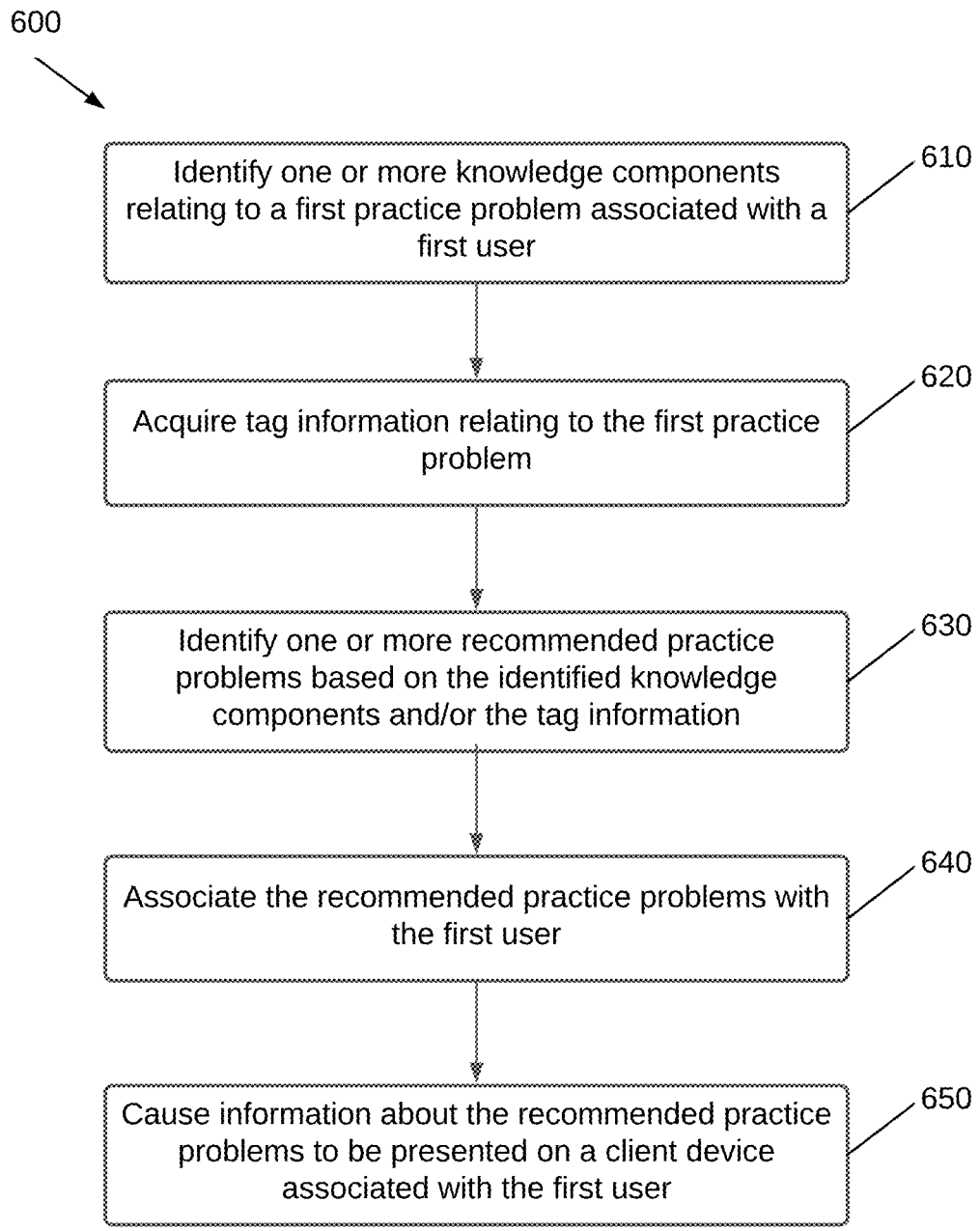
FIG. 6 is a flow diagram illustrating a method for providing personalized learning recommendations according to some implementations of the present disclosure.

FIG. 6 is a flow diagram illustrating a method 600 for providing personalized learning recommendations according to some implementations of the disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. In one implementation, method 600 may be performed by a processing device executing the recommendation module 240 as shown in FIG. 2.

Method 600 may begin at block 610 when the processing device identifies one or more knowledge components relating to a first practice problem associated with a first user. For example, the processing device may process text of the first practice problem and/or one or more solutions to the first practice problem using a trained machine learning model to identify the knowledge components relating to the first practice problem.

At block 620, the processing device may acquire tag information relating to the first practice problem. The tag information may include a first tag indicative of an importance level assigned to the first practice problem by the first user, a second tag indicative of a problem type assigned to the first practice problem by the first user, and/or any other suitable tag assigned to the first practice problem by the first user.

At block 630, the processing device may identify one or more recommended practice problems based on the identified knowledge components and/or the tag information. For example, the processing device may identify one or more candidate practice problems that are associated with the knowledge components. The processing device may select one or more of the candidate practice problems based on the tag information relating to the candidate practice problems as the recommended practice problems. The tag information relating to the candidate practice problems may include predicted tags associated with the candidate practice problems and a plurality of users. Each of the predicted tags may be a predicted value of a tag that is likely to be assigned to a respective candidate practice problem by a respective user of the plurality of users. The processing device may identify one or more of the candidate practice problems that are associated with predicted tags of predetermined values as being the recommended practice problems. For example, the recommended practice problems may include one or more candidate practice problems associated with predicted tags of predetermined aggregate values (e.g., the greatest aggregate value of predicted tags, the second greatest aggregate value of the predicted tags, etc.). The aggregate value of predicted tags of a candidate practice problem may be, for example, a sum of the values of the predicated tags associated with the plurality of known users and the candidate practice problem, an average of the predicted tags associated with the plurality of known users and the candidate practice problem, etc.

In some embodiments, the tag information relating to the candidate practice problems may be and/or include a matrix that approximates the predicted tags associated with the candidate practice problems and a plurality of users. In some embodiments, the matrix may be obtained by performing one or more operations described in connection with FIG. 7 below.

At block 640, the processing device may associate the recommended practice problems with the first student. For example, the processing device may generate a problem set including the recommended practice problems and may store information about the problem set in association with a user account of the first user.

At block 650, the processing device may cause information about the recommended practice problems to be presented on a client device associated with the first user. The information about the recommended practice problems may include, for example, a message prompting the first user to practice the recommended practice problems, content (e.g., text, images, graphics, etc.) including the recommended practice problems, content including answers and/or solutions to the recommended practice problems, information about knowledge components relating to the recommended practice problems, etc.

To cause the information about the recommended practice problems to be presented on the client device, the processing device may transmit data for presenting the information to the computing device (e.g., data for presenting one or more user interfaces including the information).

Figure 7:
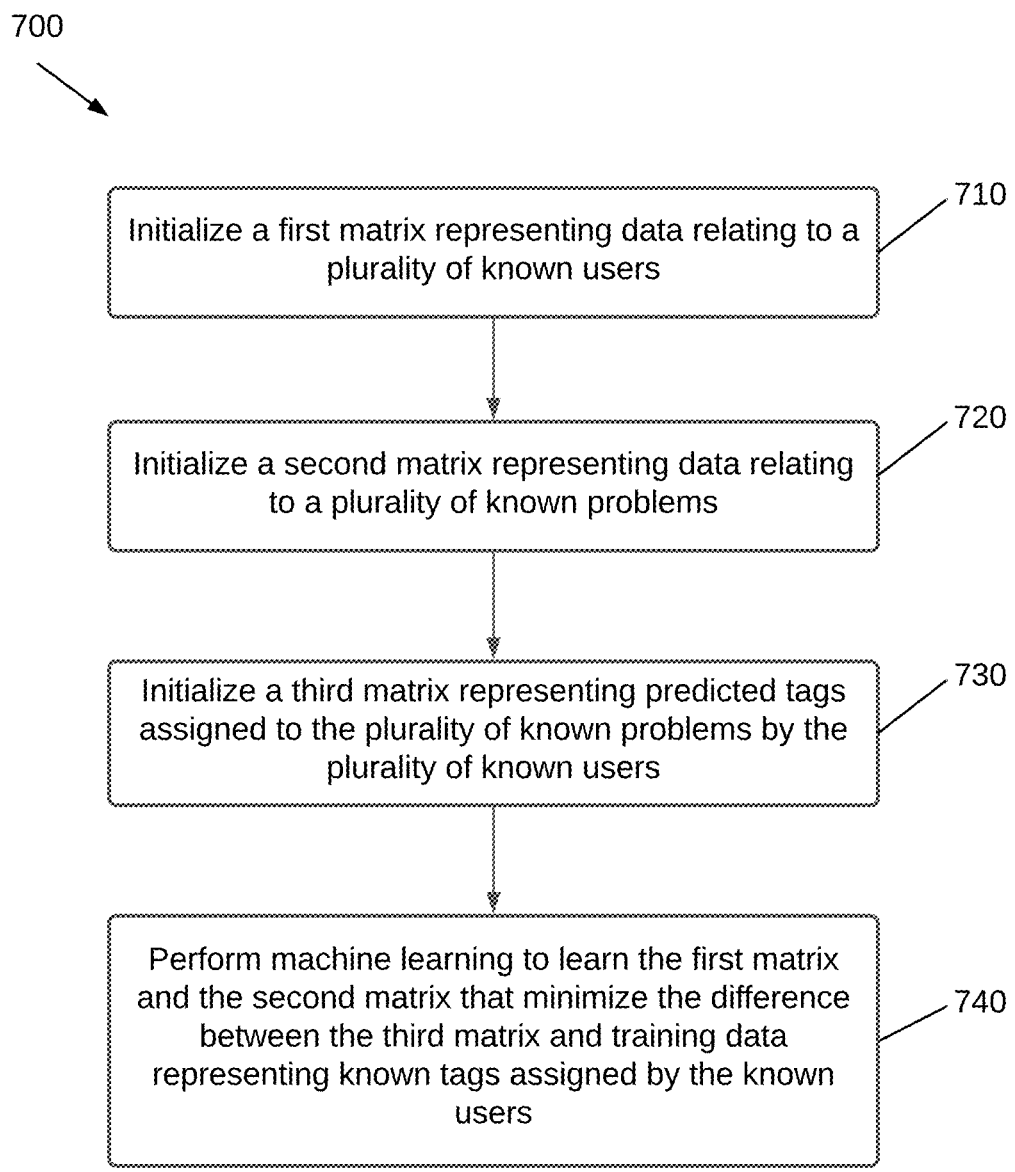
FIG. 7 is a flow diagram illustrating a method for predicting tag information of practice problems according to some implementations of the present disclosure.

FIG. 7 is a flow diagram illustrating a method 700 for predicting tag information of practice problems according to some implementations of the disclosure. The method 700 may be performed by processing logic that comprises hardware (e.g., circuitry, dedicated logic, programmable logic, microcode, etc.), software (e.g., instructions run on a processing device to perform hardware simulation), or a combination thereof. In one implementation, method 700 may be performed by a processing device executing the recommendation module 240 as shown in FIG. 2.

Method 700 may begin at block 710 when the processing device may initialize a first matrix representing data relating to a plurality of known users (e.g., student users). A first dimension of the first matrix may correspond to the known users. A second dimension of the first matrix may correspond to information relating to the known users. Each element in the first matrix may represent information relating to a respective user. In some implementations, the first matrix may be represented as an m×k matrix approximating k pieces of information relating to m users.

At block 720, the processing device may initialize a second matrix representing data relating to a plurality of known problems. A first dimension of the second matrix may correspond to the known practice problems. A second dimension of the second matrix may correspond to information relating to the known practice problems. Each element in the second matrix may represent information relating to a respective known practice problem. In some implementations, the first matrix may be represented as a k×n matrix approximating k pieces of information relating to n practice problems.

At block 730, the processing device may initialize a third matrix representing predicted tags assigned to the plurality of known practice problems by the plurality of known users. The third matrix may be a matrix product of the first matrix and the second matrix.

At block 740, the processing device may perform machine learning to learn the first matrix and the second matrix that minimize the difference between the third matrix and training data representing known tags assigned to one or more of the known problems by the known users. Performing the machine learning process may include optimizing a loss function measuring similarity between the third matrix and the training data (e.g., using a stochastic gradient descent algorithm, an alternating least squares (ALS) algorithm, and/or any other suitable optimization algorithm).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 8:
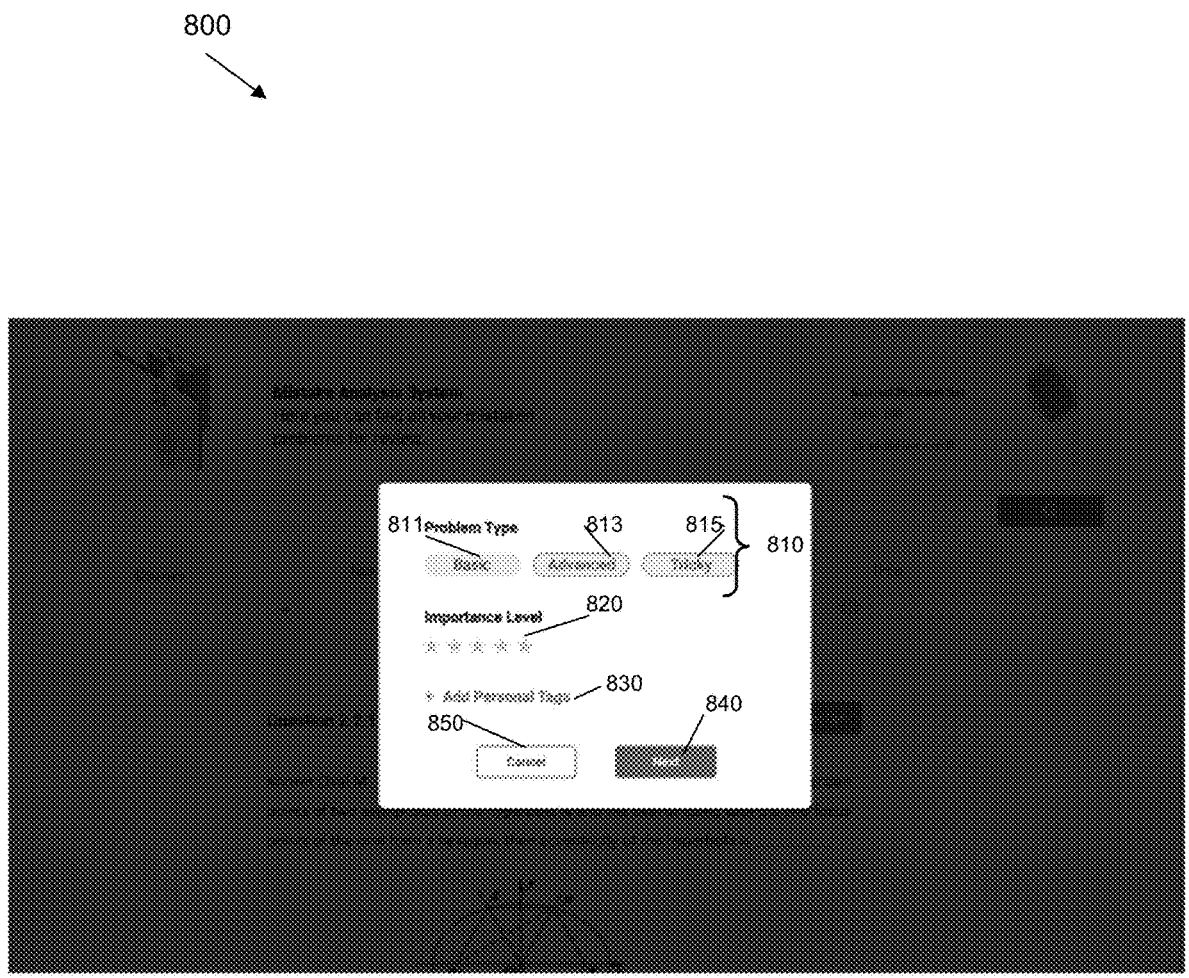
FIG. 8 depicts an example of a user interface for acquiring tag information of a practice problem in accordance with some embodiments of the present disclosure.

FIG. 8 depicts an example 800 of a user interface for acquiring tag information of a practice problem in accordance with some embodiments of the present disclosure. As shown, user interface 800 may include a first user interface (UI) element 810 for acquiring a first tag to be associated with a practice problem. The first tag may indicate a problem type to be associated with the practice problem (e.g., a "basic" tag 811, an "advanced" tag 813, a "tricky" tag 815). UI 800 may also include a second UI element 820 for acquiring a second tag to be associated with the practice problem. The second tag may include, for example, an importance level to be associated with the practice problem (e.g., a value ranging from "1" to "5" or any other suitable value). UI 800 may include a third UI element 830 for acquiring a third tag to be associated with the practice problem. The third tag may be a personal tag provided by the user. The third UI element 830 may be configured to receive text, audio input, video input, gestures, and/or any other suitable user input including the personal tag.

The UI 800 may further include a UI element 840 for receiving an indication that the tag information is to be associated with the practice problem. In some embodiments, in response to detecting a user interaction with the UI element 840 (e.g., a user selection of the UI element 840), a computing device presenting the UI 800 may associate the tag information acquired via UI 800 with the practice problem and/or a user account of the user interacting with the UI 800. In some embodiments, the UI 800 may further include a UI element 850 for receiving an indication that the tag information is not to be associated with the practice problem.

As referred to herein, a UI element may be and/or include any suitable component of a user interface that may enable user interactions with the user interface, such as a button, check box, menu, window, text box, icon, search box, address bar, navigation bar, etc. The UI element may include any suitable content, such as text, images, video content, audio content, graphics, etc.

Figure 9:
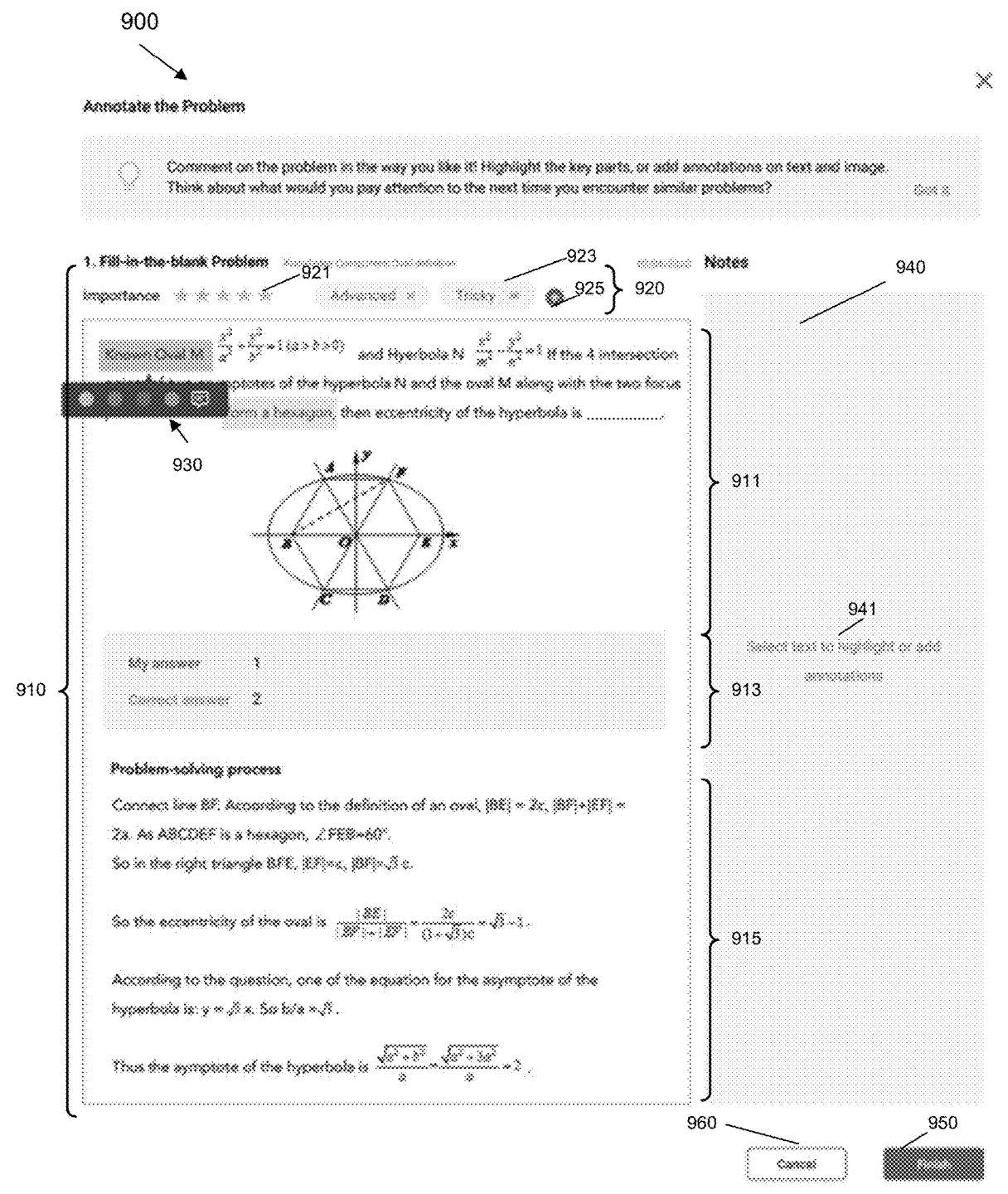

FIG. 9 depicts an example 900 of a user interface for acquiring annotation data to be associated with a practice problem in accordance with some embodiments of the present disclosure. As shown, UI 900 may include a display area 910 for presenting information about the practice problem. For example, the display area 910 may include a visual representation of the practice problems 911, a visual representation 913 of a correct answer to the practice problems and/or an answer provided by a user, and a visual representation of a solution to the practice problems 915. Each of the visual representations 911, 913, and 915 may include any suitable content for presenting the information about the practice problems, such as text, graphics, images, video content, audio content, etc.

In some embodiments, the UI 900 may include one or more UI elements 920 for presenting and/or acquiring tag information relating to the practice problems. For example, user interface 900 may include a UI element 921 for acquiring a first tag indicative of a problem type to be associated with a practice problem. UI 900 may also include a UI element 923 for acquiring a second tag indicative of an importance level to be associated with the practice problems. UI 900 may further include a UI element 925 for acquiring a third tag (e.g., a personal tag) to be associated with the practice problems.

The UI 900 may include one or more UI elements for acquiring annotation data to be associated with the practice problem and/or the user. For example, the UI 900 may include a UI element 930 for selecting and/or highlighting one or more portions of the information about the practice problems presented in the display area 910. As another example, the UI 900 may include a UI element 940 for receiving user inputs providing one or more annotations to be associated with the practice problems. The user inputs may include, for example, text inputs, audio inputs, video inputs, graphics, etc. In some embodiments, the user inputs entered in the UI element 940 may include a message from the user to another user (e.g., a teacher user). The UI element 940 may present a message 941 for prompting the user to provide annotations to be associated with the practice problems.

The UI 900 may further include a UI element 950 for receiving an indication that the annotation data provided in the UI 900 (e.g., highlights and/or selections of one or more portions of the information presented in the display area 910, the annotations entered in 941) is to be associated with the practice problem. In some embodiments, in response to detecting a user interaction with the UI element 950 (e.g., a user selection of the UI element 950), a computing device presenting the UI 900 may associate the annotation data acquired via UI 900 with the practice problem and/or a user account of the user interacting with the UI 900. In some embodiments, the UI 900 may further include a UI element 960 for receiving an indication that the annotation data is not to be associated with the practice problem.

FIG. 10 depicts an example 1000 of a user interface for autocompleting annotation data in accordance with some embodiments of the present disclosure. As shown, UI 1000 may include a UI element 1010 for acquiring user inputs including annotations to be associated with a practice problem. UI 1000 may further include a UI element 1020 for presenting information of knowledge components relating to the user input entered via the UI element 1010. For example, as illustrated in FIG. 10, a user input (e.g., the text of "recall oval") may be provided by a user in the UI element 1020. The user input may include text and/or other content representing a portion of an annotation to be associated with a practice problem (e.g., a partial entry of the annotation). Upon receiving the user input, a computing device presenting UI 1000 may present a list of knowledge components relating to the user input (e.g., descriptions of the knowledge components relating to the user input, such as "oval equation," "oval definition," and "oval shape").

The computing device presenting the UI 1000 may autocomplete the annotation to include information about one or more of the listed knowledge components (e.g., by presenting the information in the UI element 1010, creating a data item including the user input providing the portion of the annotation and the information about one or more of the listed knowledge components to represent the annotation, etc.). The information relating to the one or more of the listed knowledge components may include at least one of a definition of a first knowledge component of the knowledge components relating to the first user input (e.g., a mathematical definition of "oval") or an equation relating to the first knowledge component.

In one implementation, the annotation may be autocompleted responsive to the user input providing the portion of the annotation. In another implementation, the annotation may be autocompleted responsive to a user input initiating the autocomplete feature. For example, the annotation may be autocompleted responsive to a user interaction with the UI element 1020 (e.g., a user selection of one or more of the listed knowledge components). As another example, the annotation may be autocompleted responsive to the user pressing a tab key, a voice command, and/or any other user input indicative of a user request to initiate the autocomplete feature.

Figure 11:
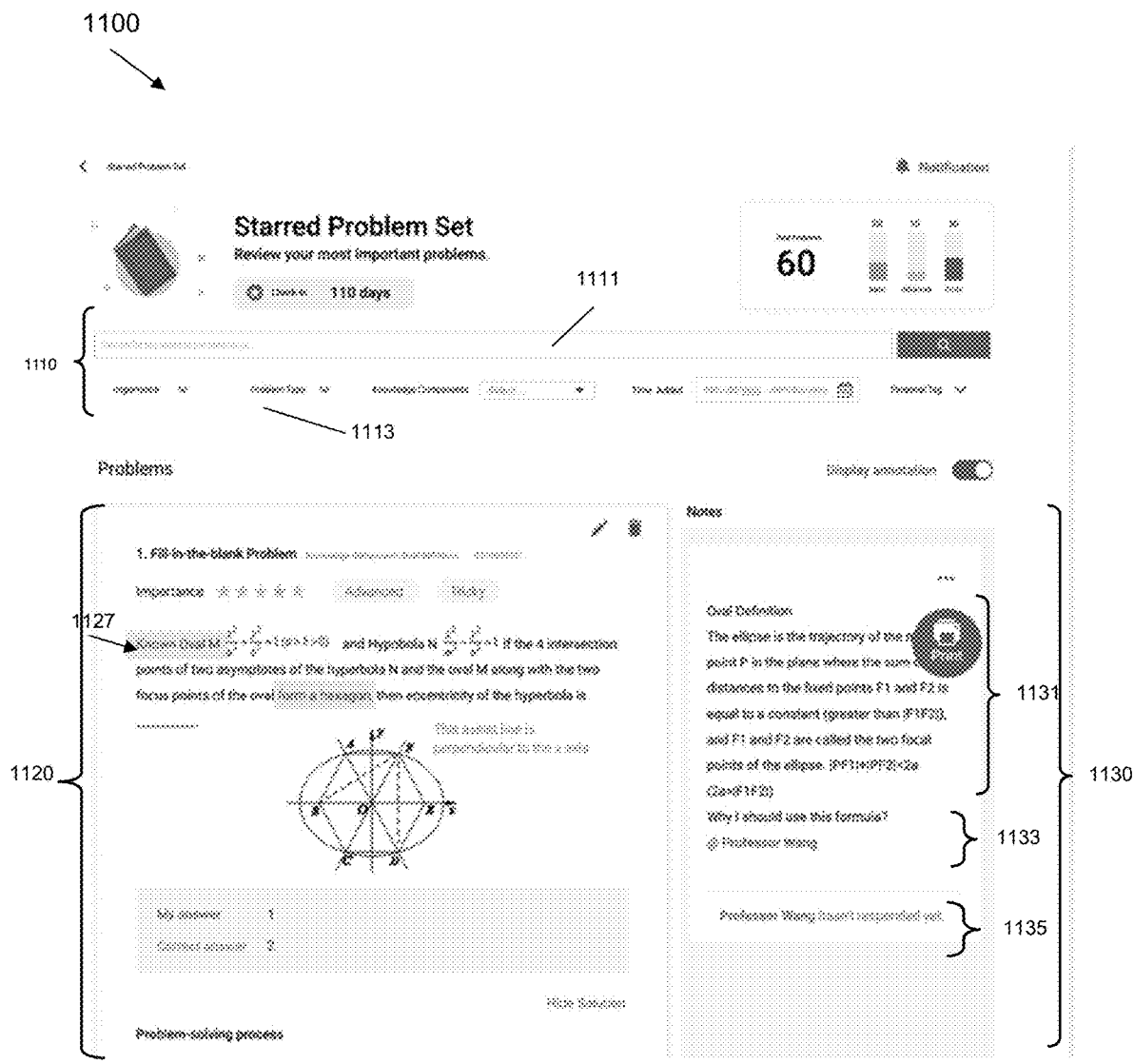
FIG. 11 depicts an example of a user interface for providing personalized reports of learning data in accordance with some embodiments of the present disclosure.

FIG. 11 depicts an example 1100 of a user interface for providing personalized reports of learning data in accordance with some embodiments of the present disclosure. UI 1100 may include one or more UI elements providing one or more filter options that may be applied to practice problems relating to the first user to generate the personalized report. For example, as illustrated in FIG. 11, UI 1100 may include a search box 1111 for acquiring search queries. A computing device presenting UI 1100 may identify one or more practice problems relating to the first user based on the search queries. As another example, UI 1100 may include a filter bar 1113 providing a plurality of filter options that may filter practice problems relating to the first user based on tag information (e.g., tags indicative of importance levels, tags indicative of practice problems types, personal tags), knowledge components, time information (e.g., creation times, last modified times), etc.

UI 1100 may further include a first display area 1120 for presenting information about the problem set. For example, as illustrated in FIG. 1100, the content presented in the first display 1120 may include content corresponding to the practice problems (e.g., the text of the practice problems, graphics relating to the practice problems), content corresponding to a solution to the practice problems, content corresponding to an answer to the practice problems, content corresponding to an answer provided by a user, etc.

UI 1100 may include a second display area 1130 for presenting annotation data associated with the practice problems and the first user, such as annotations 1131 provided by the first user in association with the practice problems, one or more messages 1133 directed to a second user (e.g., a teacher user), a reply to the messages and/or a status of the messages 1135 (e.g., a status indicating that no reply has been received), etc. In some embodiments, the annotation data presented in the second display area 1130 may include autocompleted annotations generated using the autocompletion functionalities described herein. In some embodiments, one or more portions of the annotation data associated with the first practice problem may be presented in the first display area 1120. For example, one or more portions of the text 1127 of the practice problems may be highlighted based on highlight data provided by the first user.

Figure 12:
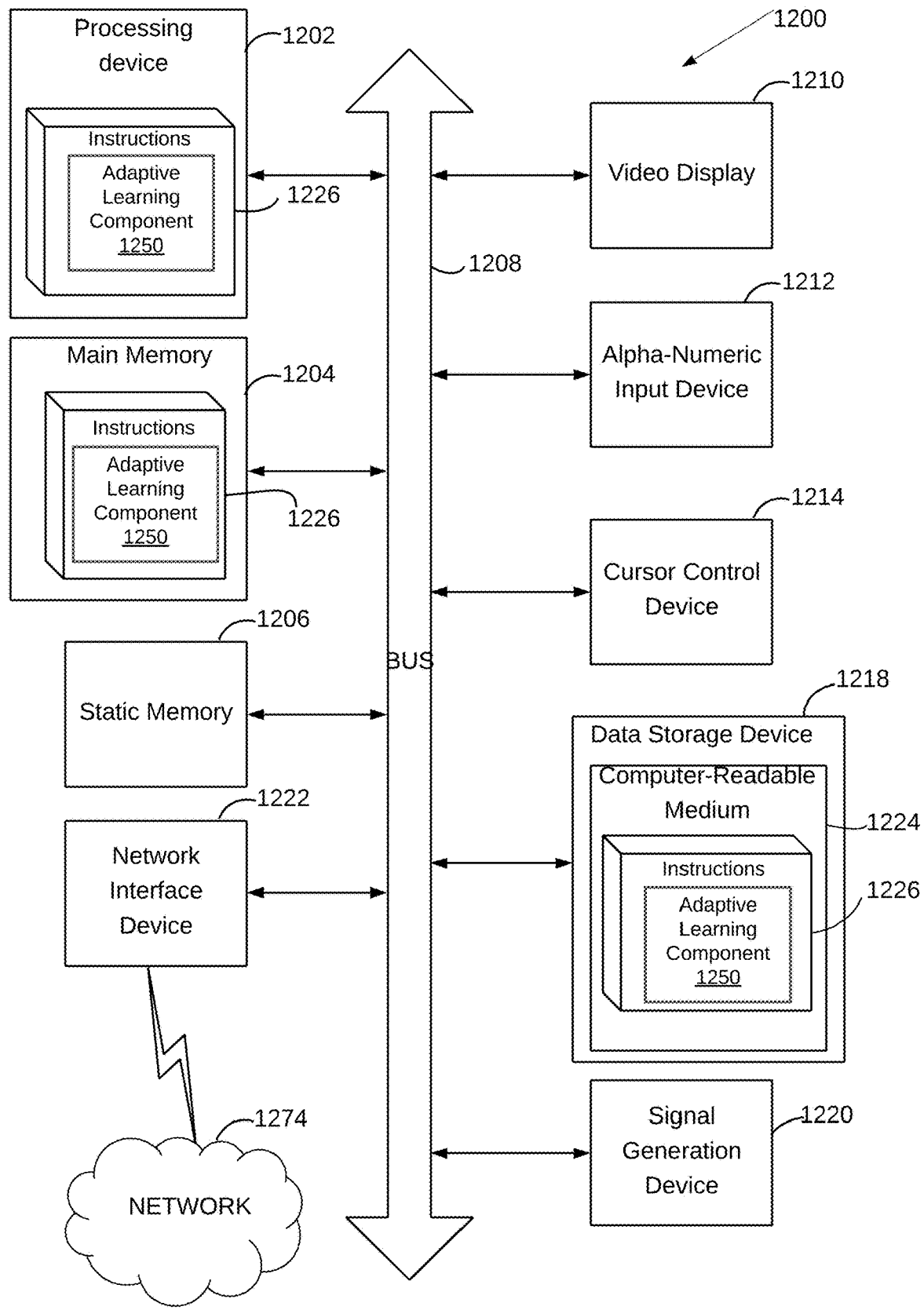
FIG. 12 is a block diagram illustrating an example of a computer system according to some implementations of the present disclosure.

FIG. 12 illustrates a diagrammatic representation of a machine in the exemplary form of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device (processor) 1202, a main memory 1204 (e.g., read-only memory (ROM), flash memory, dynamic random-access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1208.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein.

The computer system 1200 may further include a network interface device 1222. The computer system 1200 also may include a video display unit 1210 (e.g., a liquid crystal display (LCD), a cathode ray tube (CRT), or a touch screen), an alphanumeric input device 1212 (e.g., a keyboard), a cursor control device 814 (e.g., a mouse), and a signal generation device 1220 (e.g., a speaker).

The data storage device 1218 may include a computer-readable storage medium 1224 on which is stored one or more sets of instructions 1226 (e.g., software) embodying any one or more of the methodologies or functions described herein. The instructions 1226 may also reside, completely or at least partially, within the main memory 1204 and/or within the processor 1202 during execution thereof by the computer system 1200, the main memory 1204 and the processor 1202 also constituting computer-readable storage media. The instructions 1226 may further be transmitted or received over a network 1274 via the network interface device 1222.

In one embodiment, the instructions 1226 include instructions for an adaptive learning component 1250, which may correspond, respectively, to the client-side adaptive learning component 111 and/or the server-side adaptive learning component 140 described with respect to FIGS. 1 and 2, and/or a software library containing methods that provide a content item player with sing-along songs functionality. While the computer-readable storage medium 1224 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "analyzing", "determining", "prompting", "identifying," "modifying," "presenting," "updating," "training," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
   a memory and
   a processing device communicably coupled to the memory, the processing device to:
   receive a first user input providing a portion of an annotation to be associated with a first practice problem and a first user;
   identify one or more knowledge components relating to the first user input, wherein the processing device processes the first user input using a trained machine learning model configured to generate one or more outputs indicating the knowledge components included in inputs provided to the trained machine learning model and the knowledge components relating to the inputs;
   autocomplete the annotation to include information of one or more of the knowledge components, wherein the information of the one or more of the knowledge components comprises one or more of a definition of a first knowledge component of the knowledge components relating to the first user input and an equation relating to the first knowledge component;
   in view of a user request for learning data relating to the first user, present a personalized report comprising information of a first problem set associated with the first user, wherein the first problem set comprises at least one annotated practice problem relating to the first user, wherein, to present the personalized report to the first user, the processing device is further to:
   present, in a second user interface, first content corresponding to the at least one annotated practice problem relating to the first user;
   present, in the second user interface, second content corresponding to annotation data associated with the at least one annotated practice problem relating to the first user; and
   present, on a display, information of a second problem set comprising one or more recommended practice problems, wherein the one or more recommended practice problems are identified based at least in part on predicted tag information relating to a plurality of known practice problems, and wherein the predicted tag information relating to the plurality of known practice problems comprises a plurality of predicted tags associated with a plurality of users and the plurality of known practice problems, wherein the first user input corresponds to a first user interaction with a first user interface element in a first user interface, and wherein, to autocomplete, by the processing device, the annotation to include information relating to one or more of the knowledge components, the processing device is further to present the information relating to the one or more knowledge components in the first user interface element in the first user interface, wherein the annotation data comprises text, images, graphics, video content, and audio content, wherein the one or more knowledge components relating to the annotation data are identified based on the one or more outputs of the trained machine learning model.

2. The apparatus of claim 1, wherein the processing device is to autocomplete the annotation to include the information of the one or more of the knowledge components responsive to receiving a second user input initiating an autocomplete functionality provided by the processing device.

3. The apparatus of claim 1, wherein the processing device is to autocomplete the annotation to include the information of the one or more of the knowledge components responsive to receiving the first user input.

4. The apparatus of claim 1, wherein, to identify the one or more knowledge components relating to the first user input, the processing device is further to process the first user input using a trained machine learning model configured to recognize knowledge components.

5. The apparatus of claim 1, wherein the annotation data comprises a message directed from the first user to a second user and a response to the message.

6. The apparatus of claim 1, wherein the annotation data comprises the autocompleted annotation including the information of the one or more of the knowledge components.

7. The apparatus of claim 1, wherein the one or more recommended practice problems are identified based at least in part on the identified knowledge components.

8. A method, comprising,
receiving, by a processing device, a first user input providing a portion of an annotation the be associated with a first practice problem and a first user;
identifying one or more knowledge components relating to the first user input, wherein the processing device processes the first user input using a trained machine learning model configured to generate one or more outputs indicating the knowledge components included in inputs provided to the trained machine learning model and the knowledge components relating to the inputs;
autocompleting, by the processing device, the annotation to include information of one or more of the knowledge components, wherein the information of the one or more of the knowledge components comprises one or more of a definition of a first knowledge component of the knowledge components relating to the first user input and an equation relating to the first knowledge component;
in view of a user request for learning data relating to the first user, presenting a personalized report comprising information of a first problem set associated with the first user, wherein the first problem set comprises at least one annotated practice problem relating to the first user, wherein presenting the personalized report to the first user comprises:
presenting, in a second user interface, first content corresponding to the at least one annotated practice problems relating to the first user;
presenting, in the second user interface, second content corresponding to annotation data associated with the at least one annotated practice problems relating to the first user; and
presenting, by the processing device, information of a second problem set comprising one or more recommended practice problems, wherein the one or more recommended practice problems are identified based at least in part on predicted tag information relating to a plurality of known practice problems, and wherein the predicted tag information relating to the plurality of known practice problems comprises a plurality of predicted tags associated with a plurality of users and the plurality of known practice problems, wherein the first user input corresponds to a first user interaction with a first user interface element in a first user interface, and wherein autocompleting, by the processing device, the annotation to include information relating to one or more of the knowledge components comprises presenting the information relating to the one or more knowledge components in the first user interface element in the first user interface, wherein the annotation data comprises text, images, graphics, video content, and audio content, wherein the one or more knowledge components relating to the annotation data are identified based on the one or more outputs of the trained machine learning model.

9. The method of claim 8, wherein autocompleting the annotation to include the information of the one or more of the knowledge components is responsive to a second user input initiating an autocomplete functionality provided by the processing device.

10. The method of claim 8, wherein autocompleting the annotation to include the information of the one or more of the knowledge components is responsive to receiving the first user input.

11. The method of claim 8, wherein identifying the one or more knowledge components relating to the first user input comprises processing the first user input using a trained machine learning model configured to recognize knowledge components.

12. The method of claim 8, wherein the annotation data comprises a message directed from the first user to a second user and a response to the message.

13. The method of claim 8, wherein the annotation data comprises the autocompleted annotation including the information of the one or more of the knowledge components.

14. A non-transitory machine-readable storage medium storing instructions which, when executed, cause a processing device to:
receive a first user input providing a portion of an annotation the be associated with a first practice problem and a first user;
identify one or more knowledge components relating to the first user input, wherein the processing device processes the first user input using a trained machine learning model configured to generate one or more outputs indicating the knowledge components included in inputs provided to the trained machine learning model and the knowledge components relating to the inputs;

autocomplete, by the processing device, the annotation to include information of one or more of the knowledge components, wherein the information of the one or more of the knowledge components comprises one or more of a definition of a first knowledge component of the knowledge components relating to the first user input and an equation relating to the first knowledge component;

in view of a user request for learning data relating to the first user, present a personalized report comprising information of a first problem set associated with the first user, wherein the first problem set comprises at least one annotated practice problem relating to the first user, wherein, to present the personalized report to the first user, the processing device is further to:

present, in a second user interface, first content corresponding to the at least one annotated practice problem relating to the first user;

present, in the second user interface, second content corresponding to annotation data associated with the at least one annotated practice problem relating to the first user; and present, on a display, information of a second problem set comprising one or more recommended practice problems, wherein the one or more recommended practice problems are identified based at least in part on predicted tag information relating to a plurality of known practice problems, and wherein the predicted tag information relating to the plurality of known practice problems comprises a plurality of predicted tags associated with a plurality of users and the plurality of known practice problems, wherein the first user input corresponds to a first user interaction with a first user interface element in a first user interface, and wherein autocompleting, by the processing device, the annotation to include information relating to one or more of the knowledge components comprises presenting the information relating to the one or more knowledge components in the first user interface element in the first user interface, wherein the annotation data comprises text, images, graphics, video content, and audio content, wherein the one or more knowledge components relating to the annotation data are identified based on the one or more outputs of the trained machine learning model.

* * * * *